(12) United States Patent
Aravamudan

(10) Patent No.: US 9,712,482 B2
(45) Date of Patent: Jul. 18, 2017

(54) METHODS AND SYSTEMS FOR RECOMMENDING CONCEPT CLUSTERS BASED ON AVAILABILITY

(71) Applicant: Veveo, Inc., Andover, MA (US)

(72) Inventor: Murali Aravamudan, Andover, MA (US)

(73) Assignee: Veveo, Inc., Andover, MA (US)

( * ) Notice: Subject to any disclaimer, the term of this patent is extended or adjusted under 35 U.S.C. 154(b) by 326 days.

(21) Appl. No.: 14/625,423

(22) Filed: Feb. 18, 2015

(65) Prior Publication Data

US 2015/0234820 A1 Aug. 20, 2015

Related U.S. Application Data

(60) Provisional application No. 61/940,964, filed on Feb. 18, 2014.

(51) Int. Cl.
G06F 17/30 (2006.01)
H04L 12/58 (2006.01)
(Continued)

(52) U.S. Cl.
CPC ........ *H04L 51/32* (2013.01); *G06F 17/30828* (2013.01); *H04L 65/4084* (2013.01);
(Continued)

(58) Field of Classification Search
USPC ........................................ 707/758, 769, 736
See application file for complete search history.

(56) References Cited

U.S. PATENT DOCUMENTS 5,686,954 A 11/1997 Yoshinobu et al.
5,880,768 A 3/1999 Lemmons et al.
(Continued)

FOREIGN PATENT DOCUMENTS

EP 0 705 036 4/1996
WO WO 94/14284 A1 6/1994
(Continued)

OTHER PUBLICATIONS

"Electronic Program Guide via Internet," Research Disclosure 38502, Kenneth Mason Publications, Hampshire, GB, ISSN: 0374-4353, vol. 385, No. 2, p. 276, May 1996.
(Continued)

*Primary Examiner* — Hung T Vy
(74) *Attorney, Agent, or Firm* — Ropes & Gray LLP

(57) ABSTRACT

In some aspects, control circuitry may detect a social media interaction associated with a user. Control circuitry may then identify a symbol associated with the interaction, map the symbol to first media asset metadata, and identify a set of media asset metadata. Control circuitry may further compare the identified media asset metadata to a set of attributes of the user's profile, and identifying second media asset metadata and a first field of the second media asset metadata from the set of media asset metadata that matches attributes of the set of attributes of the user's profile. Control circuitry may then search databases to identify collections of media asset for recommendation to the user by identifying media assets that include the second media asset metadata in a field corresponding to the first field. Lastly, control circuitry may perform an action to provide the user with access to the collection.

20 Claims, 5 Drawing Sheets

(51) Int. Cl.
*H04L 29/06* (2006.01)
*H04N 21/25* (2011.01)
*H04N 21/466* (2011.01)
*H04N 21/472* (2011.01)
*H04N 21/482* (2011.01)

(52) U.S. Cl.
CPC ....... *H04N 21/251* (2013.01); *H04N 21/4667* (2013.01); *H04N 21/4668* (2013.01); *H04N 21/47202* (2013.01); *H04N 21/4826* (2013.01)

(56) References Cited

U.S. PATENT DOCUMENTS

| | | | |
|---|---|---|---|
| 6,216,264 | B1 | 4/2001 | Maze et al. |
| 7,493,646 | B2 | 2/2009 | Ellis |
| 7,533,399 | B2 | 5/2009 | Ma et al. |
| 7,761,892 | B2 | 7/2010 | Ellis et al. |
| 8,584,165 | B1 | 11/2013 | Kane et al. |
| 2003/0005445 | A1 | 1/2003 | Schein et al. |
| 2013/0040277 | A1* | 2/2013 | Linton ................ G06Q 10/101 434/350 |
| 2013/0232159 | A1* | 9/2013 | Daya ................... G06Q 50/01 707/758 |
| 2014/0006423 | A1 | 1/2014 | Melnychenko |
| 2014/0164887 | A1* | 6/2014 | Koukoumidis ... G06F 17/30905 715/201 |

FOREIGN PATENT DOCUMENTS

| | | |
|---|---|---|
| WO | WO 95/15658 A1 | 6/1995 |
| WO | WO 96/17473 | 6/1996 |
| WO | WO 96/21990 A2 | 7/1996 |
| WO | WO 96/31980 A1 | 10/1996 |

OTHER PUBLICATIONS

U.S. Appl. No. 09/974,345 "Systems and methods for building user media lists" Ellis, filed Oct. 9, 2001.

U.S. Appl. No. 13/626,332 "Systems and Methods for Automatic Program Recommendations Based on User Interactions" Fife et al. filed Sep. 25, 2012.

U.S. Appl. No. 13/946,180 "Personalized Content Recommendation" filed Jul. 19, 2013.

U.S. Appl. No. 08/938,028 "Internet Television Program Guide System" filed Sep. 18, 1997.

U.S. Appl. No. 11/324,212 "Systems and methods for managing content" Cordray filed Dec. 29, 2005.

U.S. Appl. No. 14/610,784 "Systems and Methods for Providing a Recommendation to a User Based on a User Profile and Social Chatter" Kelly et al. filed Jan. 30, 2015.

* cited by examiner

METHODS AND SYSTEMS FOR RECOMMENDING CONCEPT CLUSTERS BASED ON AVAILABILITY

CROSS REFERENCE TO RELATED APPLICATION

This application claims the benefit of U.S. Provisional Patent Application No. 61/940,964, filed Feb. 18, 2014, which is hereby incorporated by reference in its entirety.

BACKGROUND

The proliferation of content providers that make media available to users makes it difficult for users to efficiently identify content that they will likely be able to enjoy. Individual content providers have been offering recommendation systems that compile lists of content that may be interesting to the user based on the user's viewing history and preferences. However, a user might find the task of accessing each individual content provider to review the recommended content and select specific content of interest to be tedious. Additionally, the time-intensive process of regularly monitoring each content provider's offerings may overwhelm users wishing to remain aware of new and upcoming content offerings.

SUMMARY

Accordingly, methods and systems are disclosed herein for recommending concept clusters based on availability. For example, control circuitry may recommend concept clusters, otherwise referred to as collections of media assets, by searching the content offerings of multiple content providers that a user may be subscribed to, or may have access to. Control circuitry may select a collection of media assets based on a reference to a media asset that the user may disclose in a social media interaction, such as when the user mentions a movie in a post on a friend's social media page (e.g., FACEBOOK). Control circuitry may further refine a collection of media assets based on the user's profile, which may include media asset viewing history and preferences. Control circuitry may further refine the collection by determining whether the media asset is relevant to a user seeking to find new and upcoming content by analyzing dates associated with the media asset. Finally, control circuitry may present the collection to the user by way of a notification, or control circuitry may otherwise provide the user with access to the collection by adding the media assets of the collection to a watchlist, or by recording the media assets of the collection.

In some embodiments, control circuitry may detect a social media interaction associated with a user. The term "social media interaction," as used herein, is defined to mean any activity associated with a user's account of a service that provides the ability to create, share, exchange, and communicate information in virtual communities and networks. For example, control circuitry may detect that the user posted a comment on a social media page (e.g., FACEBOOK) associated with the user's friend. Control circuitry may then identify a symbol associated with the social interaction. As referred to herein, a symbol may include any portion of the communication itself, or any data associated with the communication. As an example, control circuitry may identify "Tom Cruise" as a symbol in the posted comment "Is Tom Cruise going to be in the movie that's coming out?" Based on the identification of a symbol, control circuitry may map the symbol to first media asset metadata. For example, control circuitry may map the symbol "Tom Cruise" to first asset metadata "Tom Cruise," which may be associated with a field describing the metadata, such as "actor." Control circuitry may then identify a set of media asset metadata corresponding to the first media asset metadata. In this example, control circuitry may identify that media asset metadata such as "Mission Impossible II," associated with a "title" field, "Nicole Kidman," associated with an "actor" field, and "sci-fi movies," associated with a "genre" field, all correspond to the metadata "Tom Cruise," associated with the field "actor." Control circuitry may select the set media asset metadata as it determines a correlation between the set of media asset metadata and the first media asset metadata. For example, control circuitry may determine that actor Tom Cruise has starred in the media asset "Mission Impossible II."

In some embodiments, control circuitry may compare media asset metadata of the set of media asset metadata corresponding to the first metadata to a set of attributes of a user profile associated with the user. As referred to herein, a profile of the user refers to a collection of information about the user and the user's media viewing habits. For example, a profile may include a list of media assets (e.g., television shows) that the user has watched, attributes associated with each television show that the user has watched, a list of ratings the user has given to different media assets, a list of content providers that the user subscribes to, the demographics of the user, and the like. For example, control circuitry may determine that the user profile reflects attributes such as the user's preference to view sci-fi movies (e.g., movies of the science fiction genre), the user's enjoyment of media assets directed by Wes Anderson, and the user's propensity to watch media asset "Planet Earth: Oceans." Control circuitry may further compare the previously identified media asset metadata, including as "Mission Impossible II," "Nicole Kidman," and "sci-fi movies" to the attributes reflected in the user profile. Based on the comparing, control circuitry may then identify second media asset metadata of the set of media asset metadata that match attributes of the identified set of attributes associated with the user profile. For example, control circuitry may identify second asset metadata "sci-fi movies" based on determining that the user profile reflects an attribute indicating the user's preference to view sci-fi movies. Further, control circuitry may identify a first field associated with the identified media asset metadata. In the case of the media asset metadata "sci-fi movies," control circuitry may determine that "genre" is the associated first field. The first field may give context to the media asset metadata, in this case, science fiction movies are identified to represent a genre of movies.

In some embodiments, control circuitry may search a set of databases to identify a collection of media assets for recommendation to the user, wherein the set of databases comprise a database of a first content provider and a database of a second content provider that is different from the first content provider, and wherein the searching comprises identifying media assets associated with the set of databases that comprise the second media asset metadata in a field corresponding to the first field. For example, control circuitry may determine that the user subscribes to content providers (e.g., NETFLIX and HULU), and a broadcast television provider. Some providers may store media assets in a first database, while storing references to media assets and information about the media assets in a second database. Some providers may store both references and information about the media assets, as well as the media assets themselves in one database. For example, a first content provider (e.g., NETFLIX) may store media assets and information about the media assets in separate databases, while a second content provider (e.g., HULU) may store media assets and information about the media assets in a single database. Control circuitry may search the database of content providers that are broadcast content providers. Such providers may only store information about media assets in a database, while pushing media assets that originate from source external to the provider, in accordance to a broadcast schedule, via television channels. For example, a broadcast content provider may store a broadcast schedule of a channel (e.g., Channel ABC) as well as information about the media assets that are referenced in the schedule in a database.

In some embodiments, control circuitry may search media asset information (e.g., metadata) stored in each of the databases corresponding to the individual content providers to identify those media assets that are associated with the second media asset metadata, in a field corresponding to the first field. For example, control circuitry may identify that media asset "Blade Runner" is associated with media asset metadata "sci-fi movie," which is associated with a "genre" field. Control circuitry may then determine that the identified media asset metadata comprises the second media asset metadata, previously identified as "sci-fi movie." Further, control circuitry may determine that the field "genre" of the identified media asset metadata "sci-fi movie" of media asset "Blade Runner" comprises the first field associated with the second media asset metadata, "genre." Control circuitry may identify a number of media assets in this fashion, collectively, these media assets may be referred to as a collection of media assets. For example, a group of identified science fiction movies comprising "Edge of Tomorrow," "Oblivion," and "Blade Runner" may be considered to be a collection. In this case, control circuitry may refer to this collection as a "sci-fi movies" collection.

In some embodiments, control circuitry may perform an action to provide the user with access to the collection of media assets. For example, control circuitry, upon identifying a collection, may notify the user of the collection, record the collection, or add the collection to the user's watchlist. An example of adding the collection to the user's watchlist is as follows. Control circuitry, after identifying a collection of media assets, may request that the content provider (e.g., NETFLIX) add those media assets that control circuitry identified as being provided by the content provider (e.g., NETFLIX) to a list (e.g., the MY LIST component of NETFLIX), which the user can review at a later time. For example, should control circuitry determine a collection comprising "Edge of Tomorrow," "Oblivion," and "Blade Runner," and further identify "Edge of Tomorrow" as a media asset offered by a specific content provider (e.g., NETFLIX), control circuitry may then send an instruction to the content provider (e.g., NETFLIX) to add the media asset "Edge of Tomorrow" to a list (e.g., MY LIST), which the user may review at a later time.

In some embodiments, the collection may comprise a set of pointers that each, respectively, point to a media asset of the collection, wherein a first pointer may point to a retrievable media asset from the database of the first content provider, and a second pointer may point to a retrievable media asset from the database of the second content provider. A pointer as described herein may refer to any identifier of the asset that allows for the retrieval of the media asset. For example, control circuitry may identify a collection comprising the media asset "Blade Runner" and media asset "Edge of Tomorrow." Control circuitry may then provide a first pointer that may be presented in the form of an HTML hyperlink that enables the user to access the media asset "Blade Runner" in a database of a first content provider (e.g., NETFLIX). Similarly, control circuitry may provide a second pointer that may also be presented in the form of an HTML hyperlink, enabling the user to access the media asset "Edge of Tomorrow," stored in the database of a second content provider (e.g., HULU).

In some embodiments, control circuitry may determine that a copy of the media asset of the media asset collection is stored on user equipment local to the user. For example, control circuitry may determine that the user had previously recorded media asset "Edge of Tomorrow" on the user's DVR. In this case, control circuitry may overwrite the reference contained in the pointer (e.g., an HTML hyperlink) by updating the referenced location associated with the asset from that of a content provider (e.g., NETFLIX) to that of the determined media asset stored on the user's DVR. For example, control circuitry may first identify media asset "Edge of Tomorrow," and determine that it is offered by a content provider (e.g., NETFLIX). Control circuitry may then determine that media asset "Edge of Tomorrow" had been recorded by the user on the user's DVR. Finally, control circuitry may update the reference contained in the pointer from the content provider (e.g., NETFLIX) location of media asset "Edge of Tomorrow" to that of the DVR location.

In some embodiments, control circuitry may determine a field associated with media asset metadata. Control circuitry may determine that a field describes the title, genre, category, actor, lead character, director, producer, and/or a review of the media asset. For example, control circuitry may determine that the media asset metadata field associated with media asset metadata "Tom Cruise" is "actor."

In some embodiments, control circuitry may determine that media asset metadata of the set of media asset metadata matches attributes of the set of the user profile, when identifying second media asset metadata that matches the attributes associated with the user profile. For example, control circuitry may identify media asset metadata to include metadata such as "Mission Impossible 2," associated with a "title" field, "Nicole Kidman," associated with an "actor" field, and "sci-fi movies," associated with a "genre" field. Control circuitry may further determine that a set of user profile attributes matches the media asset metadata. Control circuitry may determine that the user profile reflects attributes such as the user's strong preference to watch sci-fi movies, by determining that the user has watched a dozen sci-fi movies, and the user's preference to view media assets "Mission Impossible 2," and "Top Gun." The strength of an attribute of the user profile may be dependent on the number of distinct assets that manifest the user's preference for that attribute. For example, when control circuitry determines that the user has viewed nine sci-fi movies, but only one documentary, control circuitry may determine that the user has a strong preference for watching sci-fi movies. Control circuitry may then set a preference metric to reflect the strength of a user's preference for an attribute. For example, control circuitry may set the preference metric to the number of instances in which each attribute is matched to a media asset. For example, control circuitry may set the preference metric of attribute "sci-fi movies" to nine, and the preference metric of the "documentary" attribute to one. In another approach, control circuitry may assign a weighted ratio to the preference metric of each attribute. For example, control circuitry may assign the value 90 to the "sci-fi" attribute, and the value 10 to the "documentary" attribute, as these values reflect the proportion of the number of instances of sci-fi movies to the number of instances of documentaries contained in the user's viewing history. Control circuitry may then match media asset metadata with attributes of the plurality of attributes of the user profile.

In some embodiments, control circuitry may determine the second media asset metadata by selecting the media asset metadata associated with the attribute with the preference metric. For example, if the highest preference metric is equal to nine, and corresponds to the media asset metadata "sci-fi movies," control circuitry may select the "sci-fi" media asset metadata to represent the second media asset metadata. When the preference metrics of two media asset metadata are equal, control circuitry may apply a set of rules to determine which media asset metadata to select. For example, when the preference metric for the media asset metadata associated with the two attributes "sci-fi movies" and "action movies" are equal to ten, control circuitry may determine whether it had selected either of the metadata in a past recommendation. Control circuitry may then discard the metadata that had been previously selected, while retaining the previously unselected attribute. For example, if control circuitry determines that metadata associated with "sci-fi movies" had never been used to provide a recommendation, while metadata associated with "action movies" had been used in a past recommendation, control circuitry may select the metadata associated with "sci-fi movies." Control circuitry may continue applying various rules to determine metadata associated with a single attribute.

In some embodiments, when searching a plurality of databases, control circuitry may determine a plurality of attributes of the user profile. For example, control circuitry may identify a set of attributes of the user profile to be comprised of "sci-fi movies," "Tom Cruise," and "action spy movies." Further, control circuitry may determine a set of fields associated with the identified collection of media assets. For example, control circuitry may identify thirty media assets that comprise the second media asset metadata "Tom Cruise." Control circuitry may determine that an average user would be overwhelmed when presented with a collection consisting of the thirty media assets. Control circuitry may then cross-reference a set of fields associated with the thirty media assets included in the collection with the identified attributes of the user profile and select only those assets of the plurality of media assets, the fields of which control circuitry matched the plurality of attributes of the user profile. For example, control circuitry may determine that, out of the thirty media assets, media asset "Mission: Impossible—Ghost Protocol," media asset "Mission Impossible II," and media asset "Knight and Day" match attributes of the determined set of user profile attributes, which may include "sci-fi movies," "Tom Cruise," and "action spy movies." In this example, control circuitry matches the determined media assets based on the "action spy movie" attribute.

In some embodiments, control circuitry may detect a social media interaction associated with a user by, for example, monitoring the user's social media activity on social media accounts (e.g., FACEBOOK or TWITTER). For example, control circuitry may detect a social media interaction such as a user viewing a social feed, viewing a post, writing a post, viewing a profile, updating a profile, detecting an update of an interest profile of a followed friend, detecting an update of an interest profile of a friend that follows the user, sending a message, and receiving a message. Control circuitry may also detect a social media interaction that occurs in other circumstances. For example, control circuitry may detect a social media interaction that takes place during a verbal chat between two users on a Voice over IP (VoIP) service (e.g., SKYPE), during the exchange of text messages between two users using a Short Messaging Service (SMS) or a dedicated text messaging application, as well as interactions between users in chat rooms, forums, and portals. As an example, control circuitry may detect a social interaction when a user calls a second user by way of a VoIP service (e.g., SKYPE), and conducts a phone conversion. The interactions described above are not meant to be limiting as those skilled in the art will appreciate that various forms of internet-facilitated social interaction may exist.

In some embodiments, when searching a set of databases, control circuitry may search the database of a first content provider to identify one or more media assets. Control circuitry may then determine dates corresponding to media assets that control circuitry identified in the database of the first content provider. The determined dates may relate to the date when a media asset was first made available by a content provider or, in the case of media assets that are broadcast to viewers, the broadcast date. For example, control circuitry may find media asset "Mission: Impossible—Ghost Protocol" and media asset "Mission Impossible II" in the database of the first content provider. Control circuitry may then determine that a date (e.g., the date when the asset was first made available by a content provider) corresponding to media asset "Mission: Impossible—Ghost Protocol," is Jan. 2, 2015. Control circuitry may also determine that a date corresponding to media asset "Mission Impossible II" is Sep. 1, 2014. Control circuitry may then determine whether the date corresponding to each media asset is within a threshold amount of time with respect to a time the control circuitry performs the search. Control circuitry may set the threshold automatically. For example, control circuitry may analyze the frequency with which a user accesses a content provider's media asset listings. If control circuitry determines that the user views such listings frequently (e.g., at least four out of every seven days), control circuitry may infer that the user is likely to be aware of the content offerings of that content provider. Therefore, control circuitry may set the threshold to a smaller value, for example, five days. Should control circuitry determine that the user accesses the media asset listings infrequently (e.g., less than four days out of every seven days), control circuitry may set the threshold to a higher value, for example, fifty days. By doing so, control circuitry may select media assets that a content provider may have added a few months ago and which the user may still be unaware of. For example, control circuitry may determine that it performs the search on Jan. 1, 2015, and the threshold is set to five days. As follows, control circuitry may determine that the date corresponding to media asset "Mission: Impossible—Ghost Protocol" (e.g., Jan. 2, 2015) is within the threshold amount of time with respect to the searching date, while the date corresponding to media asset "Mission Impossible II" (e.g., Sep. 1, 2014) is not within the threshold amount of time with respect to the searching date.

In some embodiments, control circuitry may add the media assets of the identified media assets that control circuitry found using the database of the first media content provider to the collection based in part on a broadcast date associated with the asset. For example, control circuitry may determine that media asset "Mission: Impossible—Ghost Protocol," found in the media asset database of a broadcast television provider, has a broadcast date of Jan. 2, 2015. Control circuitry may also determine that "Knight and Day,"

found in the database of a non-broadcast media content provider (e.g., a provider that does not broadcast media, such as media content provider NETFLIX), has a date of first media asset availability of Dec. 31, 2014. When control circuitry generates for display the media assets on a display screen, control circuitry may also include the date information. This allows the user to understand why a certain media asset may have been recommended, in addition, the user may be more inclined to view a media asset that will be broadcast in the future. For example, control circuitry may determine that media asset "Knight and Day" will be broadcast at 9 PM on the following day. When displaying a notification listing control media asset "Knight and Day," control circuitry may display a message indicating that the asset will be airing at 9 PM on the following day. Such information may be useful to a user, as it allows the user to quickly identify potential media assets of interest that may be available for a limited amount of time, or at a given instance of time. In some embodiments, control circuitry may identify a media asset that may become unavailable within a certain threshold amount of time. For example, control circuitry may be configured to only add media assets to a collection of media assets if the asset remains available for at least one day following the search. For example, if control circuitry determines that media asset "Blade Runner," provided by a content provider (e.g., NETFLIX) will no longer be available tomorrow (e.g., availability is less than one day), control circuitry may exclude such a media asset from the media asset collection.

In other embodiments, the date may be associated with a promotion. For example, a content provider may lower the price of a media asset for a defined length of time. For example, to generate user interest in paying for a new sequel (e.g., a movie that develops a theme of a previous movie) that the content provider is planning to offer, control circuitry may lower the price of a movie associated with the sequel. Control circuitry may communicate the price drop to the user. For example, when paid media asset "Rio 2," which is the sequel to paid media asset "Rio," is to become available in the immediate future, the media content provider may temporarily lower the price of paid media asset "Rio" from $3 to $1 for two days, in the hopes of generating user interest in the upcoming offering. Control circuitry may then display a notification on the user screen, indicating that the price has been lowered via the promotion and that the new price is available for two more days. In fact, control circuitry may display further details associated with the promotion, such as information about the upcoming offering (e.g., "Rio 2").

In some embodiments, control circuitry may add the media assets of the identified media assets that control circuitry identified in the database of the first content provider to the collection when the date associated with the asset is within the threshold amount of time with respect to the time the searching was performed. By adding a media asset to a media asset collection, control circuitry ensures that the user will be made aware of the asset using various methods further described below. For example, control circuitry may determine that the date corresponding to media asset "Mission: Impossible—Ghost Protocol," is Jan. 2, 2015, and that the date corresponding to media asset "Mission Impossible II" is Feb. 1, 2015. Control circuitry may then determine that the searching date is Jan. 1, 2015, and that the threshold has been set to five days. In this example, control circuitry may then select media asset "Mission: Impossible—Ghost Protocol" for inclusion into the media asset collection, while omitting media asset "Mission Impossible II" from the media asset collection.

In some embodiments, control circuitry may identify a broadcast of a marathon, and define a collection to be composed of media assets aired during the marathon. As referred to herein, a marathon is defined to mean a set of related media assets (e.g., at least two media assets) that are broadcast on the same channel with little or no interruption within a period of hours, for example, a marathon could take place over a period of twelve hours. Control circuitry may determine a marathon by identifying a set of media assets, each of the media assets associated with at least one identical media asset of the same field, airing over a defined period of time. For example, control circuitry may determine that a marathon of James Bond movies will be taking place by analyzing metadata of media assets scheduled to be broadcast on a given channel (e.g., Channel ABC) and determining that five of the media assets share media asset metadata "James Bond," associated with the field "primary character." Control circuitry may then add the identified media asset to a collection of media assets, and refer to the collection as "James Bond Marathon"

In some embodiments, when performing an action to provide the user with access to the collection, control circuitry may record the media assets of the collection of media assets. For example, control circuitry may find at least some of the media assets included in the collection of media assets in a database of a broadcast television provider. Control circuitry may then automatically add such assets to the recording list of a DVR associated with the user. Alternatively, control circuitry may add the media assets of the collection of media assets to a watchlist. For example, control circuitry may find at least some of the media assets of the collection of media assets in a database of a first content provider (e.g., NETFLIX), and in the database of a second content provider (e.g., HULU). Control circuitry may then add the identified assets to the respective watchlist of the two content providers (e.g., NETFLIX and HULU). In some embodiments, control circuitry may notify the user about the media assets of the collection of media assets. For example, control circuitry may find one of the media assets of the collection of media assets in a database of a first content provider (e.g., NETFLIX), a second media asset in a database of second content provider (e.g., HULU), and a third media asset in a database of a broadcast television provider. Control circuitry may then notify the user of the collections of items by displaying a notification message on the screen of a device associated with the user that may be displayed, for example, when the user powers on the device. For example, the notification may indicate that control circuitry has identified a collection of "sci-fi movies." Control circuitry may then display the media asset of the collection of media assets as hyperlinks below a heading indicating that the assets belong to the "sci-fi movies" collection. As an example, control circuitry may identify "Edge of Tomorrow," "Oblivion," and "Blade Runner" to form the "sci-fi movies" collection, and display the name of the collection, as well as each media asset that is part of the collection, on the screen.

In some embodiments, control circuitry may identify two media assets of the collection of media assets, and may determine that both media assets have substantially similar content. For example, control circuitry may identify a first media asset (e.g., the first episode of the fifth season of the show "Breaking Bad") associated with a first content provider (e.g., NETFLIX), and a second media asset (e.g., the first episode of the fifth season of the show "Breaking Bad")

associated with a second content provider (e.g., HULU), which have substantially similar content. Control circuitry may then identify a first media asset authorization status based on the user profile associated with the user. An "authorization status," as used herein, is defined to mean an indication of how a media asset or a group of media assets may be accessed. An authorization status may indicate that a media asset may be accessed without a fee, or that a fee is required to access the media asset. An authorization status may also indicate a policy of accessing a media asset or group of media assets. For example, such a policy may indicate that a payment must be completed before a media asset may be accessed, that the media asset is available for viewing two times upon payment, and that the asset will no longer be accessible after a predefined period of time passes from the time of payment (e.g., one month). The user profile may indicate that the user is authorized to access the first media asset (e.g., the first episode of the fifth season of the show "Breaking Bad" associated with first content provider NETFLIX) without completing the payment. Control circuitry may achieve this by determining that the user subscription records are stored in the user profile, and that the subscription records indicate that any media asset offered by the content provider (e.g., NETFLIX) is available for viewing by a subscribed user. Control circuitry may then identify a second media asset authorization status based on the user profile associated with the user. For example, the user profile may indicate that the user is authorized to view the second media asset (e.g., the first episode of the fifth season of the show "Breaking Bad" associated with first content provider HULU) only after completing a payment. Control circuitry may achieve this by determining that user subscription records are stored in the user profile, and that the subscription records indicate that all media assets offered by the content provider (e.g. HULU) are available to a subscriber without the payment of a fee, with the exception of all episodes of the fifth season of the show "Breaking Bad". Control circuitry may then determine that the user is authorized to access the first media asset of the collection based on the first media asset authorization status, but not the second media asset. For example, control circuitry may determine that the user is a subscriber of the content provider associated with the first media asset (e.g., NETFLIX), and therefore may access the first media asset. Control circuitry may also determine that the user has not paid a fee to access "Breaking Bad" Season 5 episodes, and therefore, the user is not authorized to access the second media asset of the collection. Control circuitry may in response prioritize for notification the first media asset over the second media asset.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
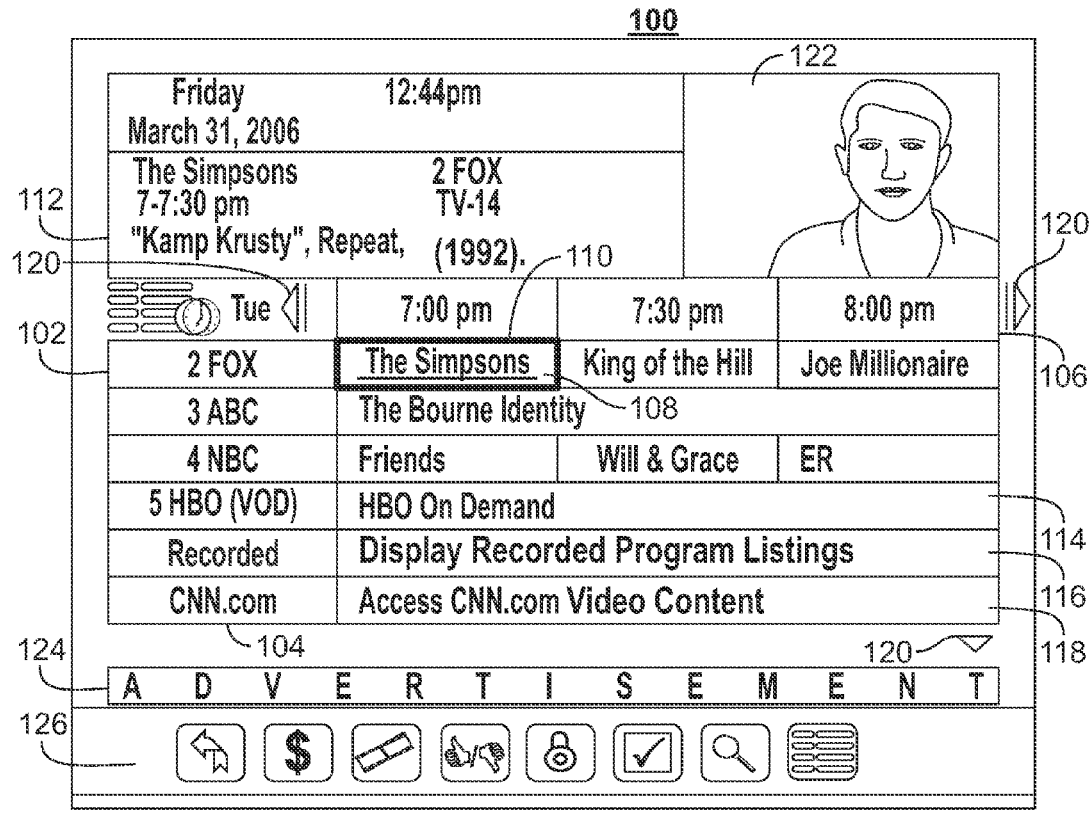
FIG. 1 shows an illustrative example of a display screen generated by a media guidance application in accordance with some embodiments of the disclosure.

In some embodiments, control circuitry may detect a social media interaction associated with a user. The term "social media interaction," as used herein, is defined to mean any activity associated with a user's account of a service that provides the ability to create, share, exchange, and communicate information in virtual communities and networks. For example, control circuitry may detect that the user posted a comment on a social media page (e.g., FACEBOOK) associated with the user's friend. Control circuitry may then identify a symbol associated with the social interaction. As referred to herein, a symbol may include any portion of the communication itself, or any data associated with the communication. As an example, control circuitry may identify "Tom Cruise" as a symbol in the posted comment "Is Tom Cruise going to be in the movie that's coming out?" Based on the identification of a symbol, control circuitry may map the symbol to first media asset metadata. For example, control circuitry may map the symbol "Tom Cruise" to first asset metadata "Tom Cruise," which may be associated with a field describing the metadata, such as "actor." Control circuitry may then identify a set of media asset metadata corresponding to the first media asset metadata. In this example, control circuitry may identify that media asset metadata such as "Mission Impossible II," associated with a "title" field, "Nicole Kidman," associated with an "actor" field, and "sci-fi movies," associated with a "genre" field, all correspond to the metadata "Tom Cruise," associated with the field "actor." Control circuitry may select the set media asset metadata as it determines a correlation between the set of media asset metadata and the first media asset metadata. For example, control circuitry may determine that actor Tom Cruise has starred in the media asset "Mission Impossible II."

In some embodiments, control circuitry may compare media asset metadata of the set of media asset metadata corresponding to the first metadata, to a set of attributes of a user profile associated with the user. As referred to herein, a profile of the user refers to a collection of information about the user and the user's media viewing habits. For example, a profile may include a list of media assets (e.g., television shows) that the user has watched, attributes associated with each television show that the user has watched, a list of ratings the user has given to different media assets, the demographics of the user, and the like. For example, control circuitry may determine that the user profile reflects attributes such as the user's preference to view sci-fi movies (e.g., movies of the science fiction genre), the user's enjoyment of media assets directed by Wes Anderson, and the user's propensity to watch media asset "Planet Earth: Oceans." Control circuitry may further compare the previously identified media asset metadata, including as "Mission Impossible II," "Nicole Kidman," and "sci-fi movies" to the attributes reflected in the user profile. Based on the comparing, control circuitry may then identify second media asset metadata of the set of media asset metadata that matches attributes of the identified set of attributes associated with the user profile. For example, control circuitry may identify second asset metadata "sci-fi movies" based on determining that the user profile reflects an attribute indicating the user's preference to view sci-fi movies. Further, control circuitry may identify a first field associated with the identified media asset metadata. In the case of the media asset metadata "sci-fi movies," control circuitry may determine that "genre" is the associated first field. The first field may give context to the media asset metadata, in this case, science fiction movies are identified to represent a genre of movies.

In some embodiments, control circuitry may search a set of databases to identify a collection of media assets for recommendation to the user, wherein the set of databases comprise a database of a first content provider and a database of a second content provider that is different from the first content provider, and wherein the searching comprises identifying media assets associated with the set of databases that comprise the second media asset metadata in a field corresponding to the first field. For example, control circuitry may determine that the user subscribes to content providers (e.g., NETFLIX and HULU), and a broadcast television provider. Some providers may store media assets in a first database, while storing references to media assets and information about the media assets in a second database. Some providers may store both references and information about the media assets, as well as the media assets themselves in one database. For example, a first content provider (e.g., NETFLIX) may store media assets and information about the media assets in separate databases, while a second content provider (e.g., HULU) may store media assets and information about the media assets in a single database. Control circuitry may search the database of content providers that are broadcast content providers. Such providers may only store information about media assets in a database, while pushing media assets that originate from source external to the provider, in accordance to a broadcast schedule, via television channels. For example, a broadcast content provider may store a broadcast schedule of a channel (e.g., Channel ABC) as well as information about the media assets which are referenced in the schedule in a database.

In some embodiments, control circuitry may search media asset information (e.g., metadata) stored in each of the databases corresponding to the individual content providers to identify those media assets which are associated with the second media asset metadata, in a field corresponding to the first field. For example, control circuitry may identify that media asset "Blade Runner" is associated with media asset metadata "sci-fi movie," which is associated with a "genre" field. Control circuitry may then determine that the identified media asset metadata comprises the second media asset metadata, previously identified as "sci-fi movie." Further, control circuitry may determine that the field, "genre" of the identified media asset metadata "sci-fi movie" of media asset "Blade Runner" comprises the first field associated with the second media asset metadata, "genre." Control circuitry may identify a number of media assets in this fashion, collectively these media assets may be referred to as a collection of media assets. For example, a group of identified science fiction movies comprising "Edge of Tomorrow," "Oblivion," and "Blade Runner" may be considered to be a collection. In this case, control circuitry may refer to this collection as a "sci-fi movies" collection.

In some embodiments, control circuitry may perform an action to provide the user with access to the collection of media assets. For example, control circuitry, upon identifying a collection, may notify the user of the collection, record the collection, or add the collection to the user's watchlist. An example of adding the collection to the user's watchlist is as follows. Control circuitry, after identifying a collection of media assets, may request that the content provider (e.g., NETFLIX) adds those media assets that control circuitry identified as being provided by the content provider (e.g., NETFLIX) to a list (e.g., the MY LIST component of NETFLIX), which the user can review at a later time. For example, should control circuitry determine a collection comprising "Edge of Tomorrow," "Oblivion," and "Blade Runner," and further identify "Edge of Tomorrow" as a media asset offered by a specific content provider (e.g., NETFLIX), control circuitry may then send an instruction to the content provider (e.g., NETFLIX) to add the media asset "Edge of Tomorrow" to a list (e.g., MY LIST), which the user may review at a later time.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
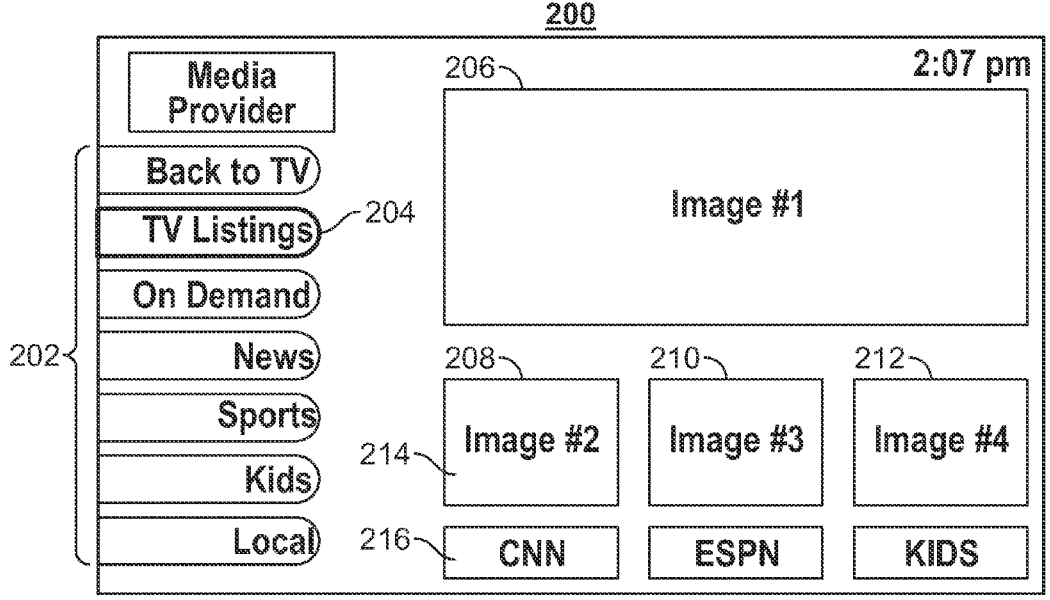
FIG. 2 shows another illustrative example of a display screen generated by a media guidance application in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
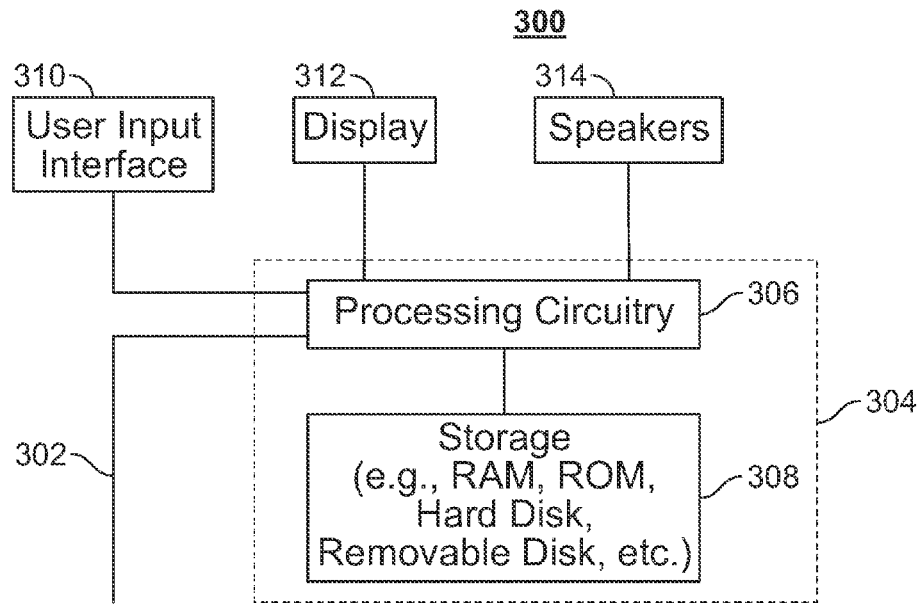
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
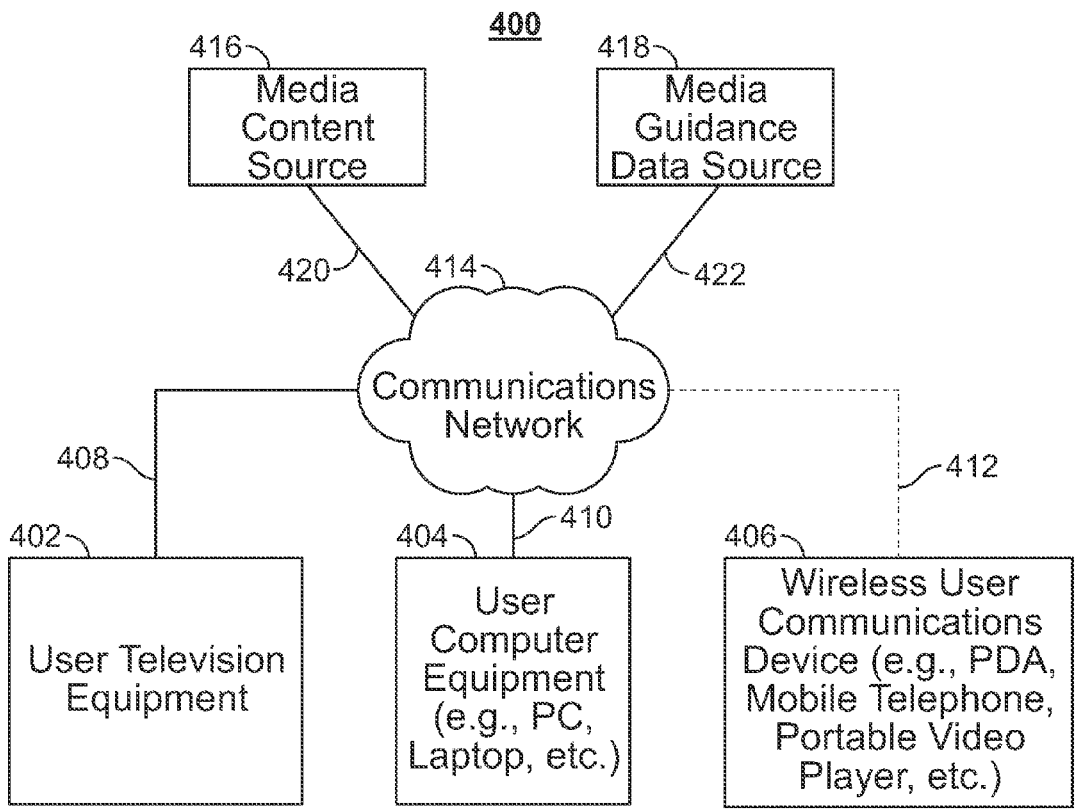
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, and wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

In some embodiments, control circuitry 304 may recommend a collection of media assets to a user, based in part on a social media interaction associated with the user and the determined attributes of the user's profile. Control circuitry 304 may then perform an action to provide the user with access to the collection, for example, control circuitry 304 may generate for display on display 312 a list of collections and media assets associated with each collection.

Figure 5:
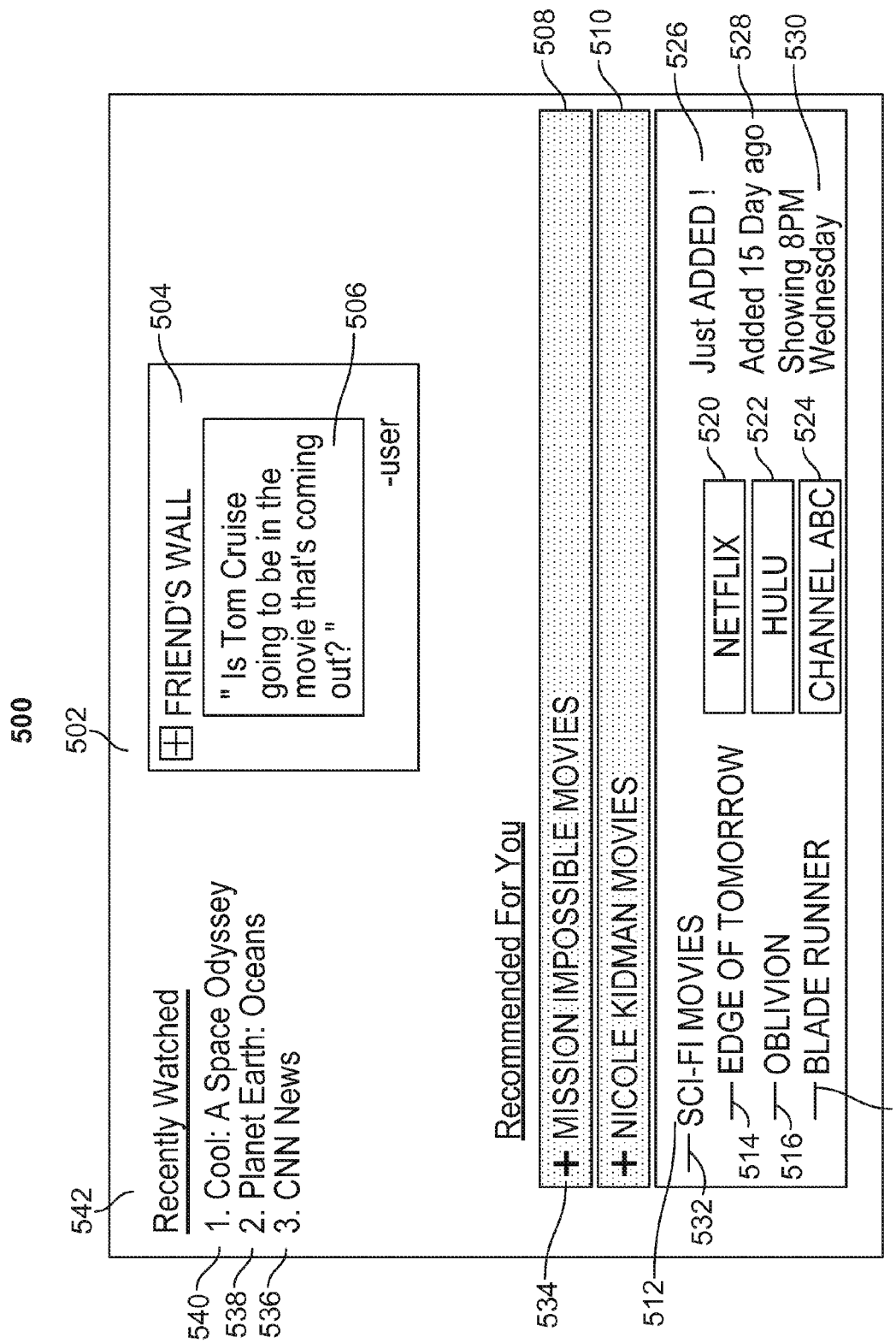
FIG. 5 shows an illustrative embodiment of a display that may be used to display components of the user profile, social interactions, and media asset collection recommendations, in accordance with some embodiments of the disclosure.

FIG. 5 shows an illustrative embodiment of a display that may be used to display components of the user profile, social interactions, and media asset collection recommendations provided by control circuitry 304, in accordance with some embodiments of the disclosure. User equipment 500 is depicted as a television screen of user television equipment 402, but may be any user equipment device, including user computer equipment 404, or wireless user communication device 406.

In some embodiments, control circuitry 304 may detect a social media interaction associated with a user. To detect a social media interaction, control circuitry 304 may periodically monitor a social network that the user is a member of, monitor the user's social network accounts in real time, or receive a notification from a social network indicating that a social media interaction has taken place. Control circuitry 304 may first acquire the user's permission to access data associated with the user's social network, for example, control circuitry 304 may prompt the user for usernames and passwords of the social media accounts (e.g., FACEBOOK and TWITTER) associated with the user. Control circuitry 304 may then receive user input of such credentials via user input device 310. Control circuitry 304 may prompt the user for such credentials whenever control circuitry detects, by monitoring the user's internet browser history, that the user has accessed a previously undetected social media account.

In some embodiments, control circuitry 304 may periodically poll, using communications network 414, the social media account (e.g., FACEBOOK and TWITTER) logs associated with a user's social media accounts (e.g., FACEBOOK and TWITTER) in order to identify new social media interactions. Such logs may be stored on a server accessible through communication network 414. Control circuitry 304 may utilize other types of logs to identify a social media interaction. For example, control circuitry 304 may instruct user equipment 500 to store a log of all user activity on the user device at storage 308. Control circuitry 304 may further instruct other equipment associated with the user, such as user television equipment 402, user computer equipment 404, and wireless user communications device 406, to transmit copies of logs associated with each device using communications network 414, so that user activity associated with those devices may be aggregated in storage 308. Control circuitry 304 may then combine logs from all devices, or search through each log associated with each device, in order to detect a social media interaction. Control circuitry 304 may maintain an aggregated log listing all of the social media interactions of the user across all devices at storage 308, however, it may also instruct a remote server to maintain such a log.

In some embodiments, a log associated with a user's activity may detail timestamps, friends, links, and the types of social interaction. A social interaction may be of a type associated with viewing a social feed, viewing a post, writing a post, viewing a profile, updating a profile, detecting an update of an interest profile of a followed friend, detecting an update of an interest profile of a friend that follows the user, sending a message, and receiving a message. In an example social media interaction, the user may post comment 506 "Is Tom Cruise going to be in the movie's that's coming out?" on social media page 504 (e.g., the friend's FACEBOOK page or TWITTER page) associated with the user's friend. It should be understood that a social media interaction may be any action that is initiated by the user, but may also be any action that is initiated by a user's friend, or even by a social media entity, such an individual or company, that may not have an association with the user. For example, a company (e.g., REGAL ENTERTAINMENT) having a social media page (e.g., FACEBOOK) may post a comment on the user's social media page, for example, "Countdown to upcoming Tom Cruise movie," which may include a link to an article about a new movie. This may occur even though the social media page of the company (e.g., REGAL ENTERTAINMENT) has no association with the user. In other words, the user may not have listed the company in the user's list of friends or interests, for example. In some embodiments, control circuitry 304 may detect an interaction associated with any internet-facilitated activity performed by the user, some examples of which may include entering search strings into a search engine, clicking ads displayed in a browser, and rating a media asset on a website of a content provider. For example, control circuitry 304 may detect that while using user computer equipment 404, the user had clicked on an ad in a browser by way of user input interface 310.

In some embodiments, control circuitry 304 may identify a symbol associated with the social media interaction. Control circuitry 304 may identify the symbol using heuristics that allow it to determine words and phrases associated with media assets. For example, control circuitry 304 may identify "Tom Cruise" as a symbol based on the user "liking" a friend's post, which may be a hyperlink to article "Tom Cruise to Play 1980s Pilot in Drug Smuggling Thriller." As another example, control circuitry 304 may identify "Tom Cruise" as a symbol in the comment 506 "Is Tom Cruise going to be in the movie that's coming out?" Various systems and methods for identifying symbols in a social media interaction are discussed in, for example, Kelly et al., U.S. patent application Ser. No. 14/610,784, filed Jan. 30, 2015, which is hereby incorporated by reference herein in its entirety.

In some embodiments, based on the identification of a symbol, control circuitry 304 may map the symbol to a first media asset metadata. For example, control circuitry 304 may map the symbol "Tom Cruise" to first media asset metadata "Tom Cruise," which may be associated with a field describing the metadata, such as "actor." To accomplish this, control circuitry 304 may use communications network 414 to access media guidance data source 418, which may include queryable data related to a media asset. For example, media guidance data source 418 may be a database associated with a media information aggregator (e.g., ALLMOVIE.COM), which provides information about movies, programs, and actors. It is noted that control circuitry 304 may use various methods to map a symbol to first media asset metadata. For example, control circuitry 304 may use "fuzzy" matching logic to determine that the symbol "Tom Cruise's" is mapped to first media asset metadata "Tom Cruise," associated with the field "actor." This may be useful when the user has made a reference to a name of a concept using natural language. For example, the concept of actor Tom Cruise may be written in various forms, each resultant from the fact that nouns may be subject to declension (e.g., the spelling of the noun may change to reflect the possessive case), words may be abbreviated (e.g., as is common when a user uses wireless user communication device 406, which may have limited capabilities of character entry via user input interface 310, abbreviating words and phrases may minimize the amount of character input by the user while still retaining the meaning of the text inputted by the user), and finally, that a user may misspell a word. An example set of variations that relate to the concept of Tom Cruise, the actor, may be "Tom Cruise's," "Tom C," and "Tom Cruse." Without "fuzzy" matching, control circuitry 304 would likely not be able to match variations such as these to asset metadata, as possessive forms, abbreviations, and misspelling of media-related concepts may not be readily stored in media guidance source 418.

In some embodiments, control circuitry 304 may use multiple symbols of the social media interaction concurrently to map the symbols to a first media asset metadata. As an example, control circuitry 304 may determine that the symbol "Cruise" is present within two symbols of the symbol "Actor" in a sequence of symbols. Control circuitry 304 may then determine that the two symbols, taken together, may map to "Tom Cruise."

Control circuitry 304 may then identify a plurality of media asset metadata corresponding to the first media asset metadata. In a manner analogous to the mapping of a symbol to media asset metadata described above, control circuitry 304 may use media guidance data source 418 to identify the plurality of media asset metadata. In this example, control circuitry 304 may identify that media asset metadata such as "Mission Impossible II" is associated with a "title" field. Control circuitry 304 may make this determination by connecting to media guidance source 418 (e.g., via communications network 414) and determining that a movie corresponding to the "Mission Impossible II" stars actor Tom Cruise. In a similar fashion, control circuitry 304 may further select media asset metadata "Nicole Kidman," associated with an "actor" field, after determining that the actress Nicole Kidman had starred in at least one movie with actor Tom Cruise. As a third example, control circuitry 304 may select media asset metadata "sci-fi movies," associated with a "genre" field, when control circuitry 304 determines that actor Tom Cruise has starred in a movie of this genre. In some embodiments, control circuitry 304 may determine that the metadata corresponding to the first media asset metadata may exist in storage 308, if, for example, a media asset had been previously watched on user equipment 500. Control circuitry 304 may then search records stored in storage 308 for metadata related to the asset. For example, if control circuitry 304 determines that the user had previously watched "Mission Impossible II" using user television equipment 402, control circuitry 304 may search for metadata related to that media asset on local storage 308, as control circuitry 304 may have previously instructed storage 308 to retain any metadata associated with the watched media asset.

In some embodiments, control circuitry 304 may compare media asset metadata of the plurality of media asset metadata corresponding to the first metadata to a plurality of attributes of a user profile associated with the user. Control circuitry 304 may maintain user profile data on user equipment located in the user's home, for example, the profile data may be stored on user television equipment 402. As another example, user profile data may be stored in a database that is remote from the user. In this example, control circuitry 304 may use communication network 414 to connect to such a database, and query or retrieve user profile data. A user profile may include any information reflecting activities or preferences of a user, such as a list of television shows the user has watched, including media assets 536, 538, and 540, attributes associated with each television show that the user has watched, a list of ratings the user has given to different media assets, a list of content providers that the user subscribes to, the demographics of the user, and the like. For example, the user profile may indicate that the user has recently watched movie 540, "2001: A Space Odyssey," television show 538, "Planet Earth: Oceans," and news segment 536, "CNN News." It should be understood that a user profile may store any data relevant to the user, including data that does not directly correspond to media asset data. For example, the user profile may store demographic information, such as an indication that the user is ten years old, and therefore, belongs to a "kids" category. Accordingly, control circuitry 304 may compare media asset metadata of the plurality of media asset metadata corresponding to the first metadata to the "kids" attribute. In another example, based on lists of movies and television shows that the user has watched in the past, control circuitry 304 may identify attributes associated with the movies and television programs. For example, in the case of the recently viewed media asset 540 (e.g., "2001: A Space Odyssey"), control circuitry 304 may determine that the user profile reflects attributes associated with the viewed media asset 540. Control circuitry 304 may determine these attributes by analyzing the records stored in the user profile to determine further information related to a recently watched media asset 540. For example, the user profile may include the genre of recently watched media asset 540 (e.g., "2001: A Space Odyssey"), and the determined attribute may be "sci-fi movie," which relates to the genre of this title. In other implementations, control circuitry 304 may use communications network 414 to connect to media guidance data source 418 in order to retrieve a set of attributes related to recently watched media asset 540.

An example of control circuitry 304 comparing media asset metadata corresponding to the first metadata to a plurality of attributes of a user profile associated with the user is as follows. Control circuitry 304 may determine that the user profile reflects attributes such as the user's strong preference to watch sci-fi movies, by determining that the user has watched a dozen sci-fi movies, and the user's preference to view media assets "Mission Impossible 2," and "Top Gun." The strength of the user's preference for media assets with a given attribute may be quantified, and may be dependent on the number of distinct assets that express the user's preference for that attribute. For example, when control circuitry determines that the user has viewed ten media assets, nine of which are sci-fi movies, but only one of which is a documentary, control circuitry 304 may determine that the user has a strong preference for watching sci-fi movies, and a weak preference for documentaries. Control circuitry 304 may then set a preference metric to reflect the strength of a user's preference for an attribute. For example, control circuitry 304 may set the preference metric to reflect the number of instances in which each attribute is matched to a media asset. For example, control circuitry 304 may set the preference metric of attribute "sci-fi movies" to nine, and the preference metric of the "documentary" attribute to one. In another approach, control circuitry 304 may assign a weighted ratio to the preference metric of each attribute. For example, control circuitry 304 may assign the value 90 to the "sci-fi" attribute, and the value 10 to the "documentary" attribute, as these values reflect the proportion of the number of sci-fi movies to the number of documentaries recorded in the user's viewing history. Control circuitry 304 may then match media asset metadata with attributes of the plurality of attributes of the user profile.

In some embodiments, control circuitry 304 may identify second media asset metadata of the plurality of media asset metadata that matches attributes of the plurality of attributes of the user profile based on the comparing. For example, control circuitry 304 may identify second media asset metadata "sci-fi movies" as matching a user's preference for media assets characterized by a certain attribute, such as "sci-fi movies." Control circuitry 304 may perform this identification by utilizing a simple character string comparison method, in which a sequence of characters comprising a user profile attribute is compared to a sequence of characters corresponding to media asset metadata, and determining that a match is made. It is noted that control circuitry 304 may employ any suitable approach to identify second media asset metadata. For example, control circuitry 304 may use "fuzzy" matching logic to determine that media asset metadata "sci-fi films" matches the attribute of the user profile "sci-fi movie." "Fuzzy" matching methods are described in further detail in Melnychenko, U.S. application Ser. No. 13/537,664, filed Jun. 29, 2012, which is hereby incorporated by reference herein in its entirety.

Further, control circuitry 304 may identify a field associated with the identified media asset metadata. The field may indicate a meaning or context of the media asset metadata. For example, the field may indicate that the metadata relates to the title, genre, category, actor, lead character, director, producer, and/or a review of a media asset. Control circuitry 304 may identify the field by sending a query to media guidance data source 418, which requests the media guidance data source 418 to provide the field of the attribute. In the case of the media asset metadata "sci-fi movies," control circuitry 304 may determine that "genre" is the associated first field.

In some embodiments, control circuitry 304 may search a plurality of databases to identify a collection of media assets for recommendation to the user, wherein the plurality of databases comprises a database of a first content provider and a database of a second content provider that is different from the first content provider, and wherein the searching comprises identifying media assets associated with the plurality of databases that comprises the second media asset metadata in a field corresponding to the first field. Control circuitry 304 may search the databases of content providers, each of which may be available in a distinct media guidance data source 418. In the case of each media content provider, media asset metadata may be stored in media content source 416. As various architectures are possible, in some implementations, media content source 416 and media guidance data source may be combined in the same database. To perform a search, control circuitry 304 may determine that the user subscribes to non-broadcast content providers (e.g., NETFLIX and HULU) and a broadcast television provider. To maintain a list of content providers, control circuitry 304 may request that the user provides authentication information, such as usernames and passwords, using user input interface 310, so that control circuitry 304 may connect to each content provider's database. This may be performed, for example, when control circuitry 304 monitors the user's internet browsing history and detects that the user accessed a new content provider. In some embodiments, control circuitry 304 may monitor and detect user interactions and automatically determine the content providers that the user uses. For example, control circuitry 304 may determine that the user has viewed media assets by accessing a video sharing service (e.g., YOUTUBE). Control circuitry 304 may then add such a content provider to a list of content providers that control circuitry 304 may use when searching for new content.

In some embodiments, control circuitry 304 may maintain a list of content providers, including content providers that offer content without a subscription. Control circuitry 304 may add some or all of such providers to a list of content providers that control circuitry 304 will then use when searching for new content. Control circuitry 304 may use any known method to connect to (e.g., via communications network 414) and query a content provider's database. For example, control circuitry 304 may generate a Structured Query Language (SQL) string, transmitted using an HTTPS protocol, to a database.

In some embodiments, control circuitry 304 may determine that a broadcast television provider is able to deliver content to the user, and control circuitry 304 may automatically query an interactive television program guide in order to search for media assets. Should control circuitry 304 determine that interactive television program guide data is stored in storage 308, control circuitry 304 may query such data stored in storage 308 to determine a media asset. In the case that control circuitry 304 may determine that the interactive television program guide data is not available in storage 308, control circuitry 304 may connect (e.g., via communications network 414) to a remote database associated with the broadcast television provider. For example, control circuitry 304 may determine that a broadcast television provider is one of the content providers that the user subscribes or has access to. Control circuitry 304 may then query storage 308 of user television equipment 402 to determine whether interactive television program guide data exists. In the event that such data does indeed exist in storage 308, control circuitry 304 may then query the interactive television program guide data to identify media content that comprises the second media asset metadata in a field corresponding to the first field. It should be noted that the systems and/or methods described in this disclosure may be applied, or used in accordance with, other systems, methods, and/or apparatuses. For example, media content source 416 and media guidance data source 418 may implement custom "plug-ins" that allow control circuitry 304 to query and retrieve results.

Each of the identified providers may store media assets and references to media assets in a database, for example, a first content provider (e.g., NETFLIX) may store media assets and information about the media assets on a first database, while a second content provider (e.g., HULU) may store media assets and information about the media assets in a second database.

Control circuitry 304 may search media assets stored on each of the databases corresponding to the individual content providers to identify those media assets that are associated with the second media asset metadata, in a field corresponding to the second media asset metadata. For example, control circuitry 304 may identify that media asset "Blade Runner," stored in the database associated with a media content provider (e.g., NETFLIX), is associated with media asset metadata "sci-fi movie," which is associated with a "genre" field. Control circuitry 304 may then determine that the identified media asset metadata comprise the second media asset metadata, previously identified as "sci-fi movie." Further, control circuitry 304 may determine that the field "genre" of the identified media asset metadata "sci-fi movie" of media asset "Blade Runner" comprises the first field associated with the second media asset metadata, "genre." It should be understood that control circuitry 304 may use "fuzzy" matching logic (e.g., searching for a closest match, as previously described), or any other methodology to identify media assets that comprise the second media asset metadata, as well for determining whether the field of a media asset corresponds to the field of the second media asset metadata. Finally, control circuitry 304 may determine a pointer to the asset, as well as the name of the content provider of which control circuitry found the asset. A pointer may be any reference that allows for the localization and retrieval of the media asset referenced by the pointer.

Individual pointers and collections of pointers (e.g., directories) are further described in greater detail in Ellis et al., U.S. Pat. No. 7,761,892, issued Jun. 30, 2010, and Ellis, U.S. Pat. No. 7,493,646, issued Jan. 28, 2009, which are hereby incorporated by reference herein in their entireties.

After identifying a media asset, control circuitry 304 may continue to search for assets in the database of a content provider. Control circuitry 304 may also proceed to search the database of a second content provider for assets comprising the second media asset metadata in a field corresponding to the first field. It should be noted that control circuitry 304 may perform the searching concurrently on all identified databases or, alternatively, by searching one database at a time. Control circuitry 304 may identify a number of media assets in this fashion, collectively, these media assets may be referred to as a collection of media assets.

EXAMPLE 1

Control circuitry 304 may determine the second asset metadata to be "action-spy movies." The field of the second asset metadata is "genre." This may indicate that control circuitry 304, having analyzed the user's social media interactions and the user's profile, as described in detail above, may have identified that the user has recently mentioned a movie or show related in some way to movies of the action-spy genre. Control circuitry 304 may then search media asset database of each of the media content providers (e.g., NETFLIX, HULU, and a broadcast TV provider) that the user subscribes or has access to determine media assets that are classified as belonging to the action-spy movie genre. For example, control circuitry 304 may identify media asset "Mission: Impossible—Ghost Protocol," media asset "Mission Impossible II," and media asset "Knight and Day" as being associated with the second media asset metadata (e.g., "action-spy movies"), in a field corresponding to the second media asset metadata (e.g., the field "genre"). The identified media assets may be referred to as "Action Spy Movies" collection. Control circuitry 304 may perform the search on all databases concurrently, or may perform the search one database at a time.

EXAMPLE 2

Control circuitry 304 may determine the second asset metadata to be "Nicole Kidman." The field of the second asset metadata is "actor." This may indicate that control circuitry 304, having analyzed the user's social media interactions and the user's profile, as described in detail above, may have identified that the user has recently mentioned a movie or show that features Nicole Kidman as an actress. Control circuitry 304 may then search media asset database of each of the media content providers (e.g., NETFLIX, HULU, and a broadcast TV provider) that the user subscribes or has access to determine media assets that have been identified to star Nicole Kidman. For example, control circuitry 304 may identify media asset "Queen of the Desert," media asset "Grace of Monaco," and media asset "Strangerland" as being associated with the second media asset metadata (e.g., the field "Nicole Kidman") in a field corresponding to the second media asset metadata (e.g., the field "actor"). The identified media assets may be referred to as the "Nicole Kidman Movies" collection.

In some embodiments, control circuitry 304 may perform an action to provide the user with access to the collection of media assets. For example, control circuitry 304, upon identifying a collection of media assets, may notify the user of the collection, record the collection, or add the collection to the user's watchlist. It should be understood that control circuitry 304 may perform an action to provide the user with access to one collection, or to multiple collections identified.

In some embodiments, control circuitry 304 may provide access to one or more collections by creating a notification on display 312. In a first example, control circuitry 304 may create such a notification when the user turns on user television equipment 402, by displaying a screen listing collections and the media assets associated with the collections. The notification need not be displayed in a dedicated screen, for example, it may be embedded in program listings display 100 as a banner. Control circuitry 304 may display the banner in a dedicated area of program listings display 100, which displays the media asset collections to the users. In an alternative approach, control circuitry 304 may embed a link in program listing display 100, which may reference a separate screen that may display the collections. In another example, control circuitry 304 may instruct a social media network (e.g., FACEBOOK) to generate a post on the user's page associated with the social media network, listing the collections and the media assets associated with the collections, as well as including pointers to each asset of the collection for retrieval in response to a user selection. To accomplish this, control circuitry 304 may generate a message detailing the collections and media assets associated with the collections, and transmitting this message over communications network 414 to the social media network (e.g., FACEBOOK), instructing the social media network to generate a post with the contents of the message on a page associated with the user. In a third example approach, control circuitry 304 may instruct the user's wireless user communication device 406 to create a pop-up notification. For example, control circuitry 304 may specify that the pop-up notification is generated at a certain time and day of the week. Control circuitry 304 may determine the time and date combination by identifying the user's media viewing habits. For example, control circuitry 304 may determine that the user regularly views media assets at 8 PM on Friday evenings. Therefore, control circuitry 304 may instruct the user's wireless user communication device 406 to create a notification at 7:50 PM on Fridays, as the user is likely to be interested in finding a media asset offering at that time, based on previous viewing habits. This notification may be presented by way of a pop-up being displayed on wireless user communication 406.

In some embodiments, control circuitry 304 may notify the user of the collection by creating a notification on display 312. As noted previously the display screen may be one of a user television equipment 402, user computer equipment 404, or wireless user communication device 406. For example, when the user wishes to view media recommendations, control circuitry 304 may detect a user input from user input interface 310. Control circuitry 304 may then generate for display a label 508 for the collection on display 312. Beneath the label, control circuitry 304 may display the individual media assets of the collection. A label as referred to herein may be defined to mean any graphic indicator that communicates information to the user. In the example in which the collection is determined using second media data "Mission Impossible," control circuitry 304 may generate for display on display 312 a label 508 "Mission Impossible movies." The label may refer to the second media asset metadata that control circuitry 304 used to determine media assets of the collection. This may be helpful to users wishing to quickly identify a collection of interest. In a different example, in which control circuitry 304 determines a collection based on second media asset metadata "sci-fi movies," control circuitry 304 may generate for display label 512 "Sci-Fi Movies." Control circuitry 304 may also generate an "expand" button 534. When the user wishes to view the individual media assets that control circuitry 304 assigned to a collection, the user may use user input interface 310 to select the "expand" button 534. When the user selects the "expand" button associated with label 512, itself associated with a "sci-fi movies" collection, control circuitry 304 may display the individual media assets associated with "sci-fi movies" collection. It is noted that in FIG. 5 the "expand" button associated with label 512 is not pictured, as control circuitry 304 has replaced the "expand" button associated with label 512 with a "collapse" button 532. In response to the user selecting the "collapse" button 532, control circuitry 304 may remove all individual listings from display 312, while retaining label 512. The media asset 514 "Edge of Tomorrow," media asset 516 "Oblivion," and media asset 518 "Blade Runner," are displayed. Additionally, control circuitry 304 may display the name of the content provider associated with each media asset. For example, the content provider of media asset 514 is listed as content provider NETFLIX 520, the content provider of asset 516 is listed as HULU 522, and the content provider of media asset 518 is listed as Channel ABC, 524. It should be understood that the collection and the media assets included in the collection may be accessible in the example forms described above through a second device, such as user television equipment 402, user computer equipment 404, and wireless user communications device 406.

In some embodiments, control circuitry 304 may notify the user of the collection and the media assets associated with each collection by way of speakers 314. Control circuitry 304 may provide such a notification in response to receiving a user input via user input interface 310, which may be a microphone, indicating that the user wishes to view media asset recommendations.

In some embodiments, control circuitry 304 may receive a user input from the user (e.g., by way of user input interface 310), indicating a selection of a media asset from the collection for viewing. For example, when the user views the collection on user television equipment 402, the user may use any available user input interface 310, such as a remote control, to indicate a selection.

In some embodiments, the collection may comprise a plurality of pointers that each, respectively, point to a media asset of the collection, wherein a first pointer may point to a retrievable media asset from the database of the first content provider, and a second pointer may point to a retrievable media asset from the database of the second content provider. For example, control circuitry 304 may identify a collection comprising the media asset 514 and media asset 518. Control circuitry 304 may then provide a first pointer that may be embedded in the form of an HTML hyperlink that enables the user to access the media asset 514 in a database of content provider 520 (e.g., NETFLIX). The link may be embedded in the label referring to media asset 514. Similarly, control circuitry 304 may provide a second pointer that may also be presented in the form of an embedded HTML hyperlink, enabling the user to access the media asset 518 stored in the database of content provider 522 (e.g., HULU). The link may be embedded in the label referring to media asset 516.

In some embodiments, control circuitry 304 may provide a deep link to an asset. A deep link, as referred to herein, relates to a link that directs to a specific media asset, rather than a general webpage describing the media asset, or a general webpage of the content provider. For example, control circuitry 304 may provide a deep link to media asset "Mission: Impossible—Ghost Protocol." Upon receiving a user input indicating to access the media asset (e.g., via user input interface 310), control circuitry 304 may retrieve the specific content (e.g., the media asset "Mission: Impossible—Ghost Protocol") referenced by the deep link.

In some embodiments, control circuitry 304 may determine that a media asset of the media asset collection is stored on user equipment local to the user. For example, control circuitry 304 may determine that the user recorded media asset "Edge of Tomorrow" on the user's DVR. In this case, control circuitry 304 may overwrite the pointer (e.g., an HTML hyperlink) by updating the location of the media asset from that of a content provider (e.g., NETFLIX) to that of the determined media asset stored on the user's DVR.

In some embodiments, control circuitry 304 may also display a label indicating the broadcast date or age of the media asset included in the collection. For example, media asset 514 may include a label "Just Added" 526, indicating that the content provider NETFLIX 520 recently added this asset to media content source 416. As another example, media asset 518 may include a label "Showing 8 PM Wednesday" 530, which indicates that content provider 524 may air the media asset at a date and time in the near future. By providing labels indicating the broadcast date or age of a media asset, control circuitry 304 may educate the user on each content provider's newest offerings within the context of the media asset collection. By doing so, control circuitry 304 provides an advantageous way of keeping the user up-to-date on upcoming shows and new additions. For example, a user who is an avid fan of sci-fi movies may have become familiar with all sci-fi movies available on each content provider. After subscribing to a certain content provider (e.g., NETFLIX) for one year, the user may become very well aware of all sci-fi movie that are available in that content provider's (e.g., NETFLIX) offering, and may have in fact already seen some of the offerings in which he or she are most interested. However, as new content may constantly be added by media content providers, it becomes tedious for the user to constantly monitor his or her interest by way of not only reviewing media assets associated with a content provider with which the user is already familiar with (e.g., NETFLIX), but also by reviewing other content providers he or she may be subscribed to (e.g., HULU, YOUTUBE, etc.). Additionally, the user may be unaware of new content added to content providers to which the user has access, but has not utilized for viewing content in the past. For example, the user may be able to access content offerings of a video-sharing service (e.g., VIMEO) without a subscription, but may not have viewed content associated with that provider in the past, and may even be unaware that the content provider exists.

In some embodiments, control circuitry 304 may dynamically update the contents of the collection. For example, control circuitry 304 may generate a collection of media assets on a first day (e.g., Monday). On a second day (e.g., Tuesday), control circuitry 304 may redetermine the media assets of the collection. For example, on the second day control circuitry 304 may determine that a first media content provider (e.g., NETFLIX) may have made available a new media asset that should be added to the collection, in adherence to the principles previously described. Also, control circuitry 304 may determine that a media asset previously included in the collection, found in the database of a second media content provider (e.g., HULU), may need to be removed from the collection, as control circuitry 304 may determine that the data that the asset was made first available is now outside of the threshold amount of time with respect to the date corresponding to the second day (e.g., Tuesday). Control circuitry 304 may further manage the contents of the collection by receiving input from the user, for example, using user interface 310. In one example, control circuitry 304 may determine that a user has never acted on a recommended media asset, even though said asset has been recommended multiple times in the past. Control 304 may determine this by recording each recommended collection, and the user's actions in response to viewing a collection. For example, control circuitry 304 may determine that the user has never acted on media asset "Knight and Day" in spite of this media asset having been recommended three times: as part of the "Actor Tom Cruise" collection, as part of the "Action-Spy Movies" collection, and as part of the "Director James Mangold" collection. As follows, control circuitry 304 may avoid including this media asset in future collections. As another example, control circuitry 304 may receive input from the user, via user interface 310, indicating that the user is not interested in a given media asset.

In some embodiments, control circuitry 304 may add the media assets of the collection to a list for recording. For example, if a media asset of the collection of media assets is media asset "Blade Runner" 518, airing on a particular channel (e.g., Channel ABC), control circuitry 304 may automatically add the asset to the recording list of a DVR associated with the user. Media assets that are not broadcast may not be available for recording.

In some embodiments control circuitry 304 may add the media assets of the collection of media assets to a watchlist. A watchlist may refer to a user-customizable list provided by the content provider for storing media assets for later viewing. A watchlist may include a list of programs added manually by the user, or automatically by any suitable process. Once the user views a media asset present in the watchlist, the media asset may then be removed from the watchlist. A user may request that a media asset be added to the watchlist by selecting an option associated with watchlist functionality. For example, some content providers (e.g., NETFLIX) currently offer watchlists (e.g., a MY LIST component), which may be used to mark media assets for later viewing.

In some embodiments, control circuitry 304 may determine that media asset metadata of the set of media asset metadata match attributes of the set of the user profile, when identifying second media asset metadata that match the attributes associated with the user profile. For example, control circuitry 304 may identify media asset metadata to include metadata such as "Mission Impossible 2," associated with a "title" field, "Nicole Kidman," associated with an "actor" field, and "sci-fi movies," associated with a "genre" field. Control circuitry 304 may further determine that a set of user profile attributes matches the media asset metadata. Control circuitry 304 may determine that the user profile reflects attributes such as the user's strong preference to watch sci-fi movies, by determining that the user has watched a dozen sci-fi movies, and the user's preference to view media assets "Mission Impossible 2," and "Top Gun." The strength of an attribute of the user profile may be dependent on the number of distinct assets that manifest the user's preference for that attribute. For example, when control circuitry determines that the user has viewed nine sci-fi movies, but only one documentary, control circuitry 304 may determine that the user has a strong preference for watching sci-fi movies. Control circuitry 304 may then set a preference metric to reflect the strength of a user's preference for an attribute. For example, control circuitry 304 may set the preference metric to the number of instances in which each attribute is matched to a media asset. For example, control circuitry 304 may set the preference metric of attribute "sci-fi movies" to nine, and the preference metric of the "documentary" attribute to one. In another approach, control circuitry 304 may assign a weighted ratio to the preference metric of each attribute. For example, control circuitry 304 may assign the value 90 to the "sci-fi" attribute, and the value 10 to the "documentary" attribute, as these values reflect the proportion of the number of instances of sci-fi movies to the number of instances of documentaries contained in the user's viewing history. Control circuitry 304 may then match media asset metadata with attributes of the plurality of attributes of the user profile.

In some embodiments, control circuitry 304 may determine the second media asset metadata by selecting the media asset metadata associated with the preference metric with the highest value. For example, if the highest preference metric is equal to ten, and corresponds to the media asset metadata "sci-fi movies," control circuitry 304 may select the "sci-fi" media asset metadata to represent the second media asset metadata. If two media asset metadata are associated with the same preference metric, and control circuitry 304 determines that the preference metric has the highest value, control circuitry 304 may use a tie-breaking process to determine which of the two media asset metadata to select as the second media asset metadata. For example, when the preference metric for the media asset metadata associated with the two attributes "sci-fi movies" and "action movies" is equal to ten, control circuitry 304 may determine whether it had selected either of the metadata in a past recommendation. Control circuitry 304 may then discard the metadata that had been previously selected, while retaining the previously unselected attribute. For example, if control circuitry determines that metadata associated with "sci-fi movies" had never been used to provide a recommendation, while metadata associated with "action movies" had been used in a past recommendation, control circuitry 304 may select the metadata associated with "sci-fi movies." Control circuitry 304 may continue applying various rules to determine metadata associated with a single attribute. By comparing the media asset metadata to attributes of the user profile, control circuitry 304 may refine the recommendation process by selecting a second media asset metadata that has an association with content from the user profile.

In some embodiments, control circuitry 304 may augment the preference metrics used in selecting the media asset metadata by using various weighting schemes. Control circuitry 304 may base a weighting scheme on any user-specific information that may be associated to the media asset metadata. For example, control circuitry 304 may apply a higher weight (e.g., the preference metric of "Nicole Kidman" metadata may be increased by 20%) to the preference metric of a media asset metadata "Nicole Kidman," if control circuitry 304 determines that the user follows the social network page (e.g., TWITTER) of Nicole Kidman. However, should control circuitry 304 determine at the same time that the user does not follow the social network page (e.g., TWITTER) of Tom Cruise, control circuitry 304 may not apply a weight to corresponding media asset metadata "Tom Cruise," or may apply a negative weight (e.g., the preference metric of "Tom Cruise" metadata may be decreased by 20%). Using similar principles, control circuitry 304 may determine preference metric weights through various other methods. For example, control circuitry 304 may determine preference metric weights through other social media interactions associated with the user, by using the user's web browser history (e.g., the user has searched for the term "Nicole Kidman" in the past), by determining that the user has been ranking Nicole Kidman movies on a website collecting movie ratings, and by determining that the user has viewed moves which feature Nicole Kidman, as a result of previous recommendations.

In some embodiments, when searching a plurality of databases, control circuitry 304 may identify a plurality of attributes of the user profile. For example, control circuitry 304 may determine a plurality of attributes of the user profile to be comprised of "sci-fi movies," "Wes Anderson," and "action spy movies." Further, control circuitry 304 may determine a plurality of fields associated with the identified collection of media assets. For example, control circuitry 304 may identify thirty media assets that comprise the second media asset metadata "Tom Cruise." Control circuitry 304 may determine that an average user would be overwhelmed when presented with a collection consisting of the thirty media assets. Control circuitry 304 may determine this, for example, by referencing a threshold specifying the maximum number of media assets that are to be included in a collection at one time. Control circuitry 304 may then cross-reference a plurality of fields associated with the thirty media assets included in the collection with the identified attributes of the user profile. Control circuitry 304 may select only those assets of the plurality of media assets, the fields of which control circuitry 304 matched to the plurality of attributes of the user profile. For example, control circuitry 304 may determine that out of the thirty media assets, media asset "Mission: Impossible—Ghost Protocol," media asset "Mission Impossible II," and media asset "Knight and Day" match an attribute of the determined set of user profile attributes, "sci-fi movies," "Wes Anderson," and "action spy movies." In this example, control circuitry 304 may match the determined media assets with the "action spy movie" attribute. Meanwhile, control circuitry 304, which may have included media asset "Top Gun" for inclusion into the collection, may determine that media asset "Top Gun" does not match any of the example attributes of the user profile, as "Top Gun" does not belong to the genre of sci-fi or action spy movies, and is not associated with Wes Anderson. Therefore, control circuitry 304 excludes media asset "Top Gun" from the collection.

In some embodiments, when searching a plurality of databases, control circuitry 304 may search the database of a first content provider to identify one or more media assets. Control circuitry 304 may then determine dates corresponding to media assets that control circuitry found using the database of the first content provider. The determined dates may relate to the date when a media asset was first made available by a content provider or, in the case of media assets that are broadcast to viewers, the broadcast date. For example, control circuitry 304 may find media asset "Mission: Impossible—Ghost Protocol," and media asset "Mission Impossible II" using the database of the first content provider (e.g., NETFLIX). Control circuitry 304 may then determine that a date (e.g., the date when the asset was first made available by a content provider) corresponding to media asset "Mission: Impossible—Ghost Protocol," is Jan. 2, 2015. Control circuitry 304 may also determine that a date corresponding to media asset "Mission Impossible II" is Feb. 1, 2015.

In some embodiments, control circuitry 304 may then determine whether the date corresponding to each media asset is within a threshold amount of time with respect to a time the search is performed. The data corresponding to each media asset may be associated with the date that the media asset was added to the content provider's offerings. In the cases where a media asset is associated with a broadcast television provider, the date corresponding to the media asset may be associated with a broadcast time. Control circuitry 304 may utilize other types of dates. The threshold may be set to a static value, such as five days. Alternatively, control circuitry 304 may determine a threshold value for each media asset. For example, control circuitry 304 may determine that the user has watched 0.1% of all assets available through the content provider associated with the media asset. Based on this analysis, control circuitry 304 may determine that the user is an infrequent viewer of media assets associated with the media provider, and may in turn set a larger threshold (e.g., six months). On the other hand, when control circuitry 304 determines that the user has watched 3% of all available assets through the content provider, control circuitry 304 may infer that the user is an avid watcher of media assets associated with content provider. Thus, control circuitry 304 may set a smaller threshold (e.g., two weeks), as the user may already be familiar with existing offerings of the content provider. In this case, the user may benefit from being notified of new assets becoming available from the content provider, instead of older assets with which they may already be familiar.

In some embodiments, control circuitry 304 may add the media assets of the identified media assets that control circuitry found using the database of the first content provider to the collection based in part on the date associated with the asset. This date may be one of a broadcast date, and date of first media asset availability. For example, control circuitry 304 may determine that media asset "Mission: Impossible—Ghost Protocol," found in the media asset database of a broadcast television provider, has a broadcast date of Jan. 2, 2015. Control circuitry 304 may also determine that "Knight and Day," found in the NETFLIX database, has a date of first media asset availability of Dec. 31, 2014. When control circuitry 304 generates for display the media assets on a display 312, control circuitry 304 may also include the date information associated with each asset. This allows the user to understand the reason for which a certain media asset may have been recommended, in addition, the user may be more inclined to view a media asset that will be broadcast in the future. For example, control circuitry 304 may determine that media asset "Knight and Day" will be broadcast at 9 PM on the following day. When displaying a notification listing control media asset "Knight and Day," control circuitry 304 may display a message indicating that the asset will be airing at 9 PM on the following day. Such information may be useful to a user, as it allows the user to quickly identify potential media assets of interest that may be available for a limited amount of time, or at an instance of time. In some embodiments, control circuitry 304 may identify a media asset that may become unavailable within a certain threshold amount of time. For example, control circuitry 304 may be configured to only add media assets to a collection of media assets if the asset remains available for at least one day, if such a media asset is provided by a content provider. For example, if control circuitry 304 determines that media asset "Blade Runner," provided by a content provider (e.g., NETFLIX), will no longer be available after tomorrow, control circuitry 304 may exclude such a media asset from the media asset collection In other embodiments, the date may be associated with a promotion. For example, a content provider may lower the price of a media asset for a defined length of time. For example, to generate user interest in purchasing a sequel (e.g., a movie that develops a theme of a previous movie) that is to become available in the future, control circuitry 304 may lower the price of a movie associated with the sequel. Control circuitry 304 may communicate the price drop to the user. For example, when paid media asset "Rio 2," which is the sequel to media asset "Rio," is to become available as a paid media asset, the media content provider may temporarily lower the price of paid media asset "Rio" from $3 to $1 for two days, in the hopes of generating user interest in the upcoming offering. Control circuitry 304 may then display a notification on the user screen, indicating that the price has been lowered via the promotion and that the new price is available for two days.

In some embodiments, control circuitry 304 may determine the data associated with the searching, the threshold number of days, and a data associated with a media asset. For example, control circuitry 304 may determine that the searching is performed on Jan. 1, 2015, that the threshold amount of time is measured in days, and the threshold is set to five days. As follows, control circuitry 304 may determine that the date corresponding to media asset "Mission: Impossible—Ghost Protocol" is within the threshold amount of time with respect to the searching date, while the date corresponding to media asset "Mission Impossible II" is not within the threshold amount of time with respect to the searching date.

In some embodiments, control circuitry 304 may add the media assets of the identified media assets that are found using the database of the first content provider to the collection when the date associated with the asset is within the threshold amount of time with respect to the time the searching was performed. By adding a media asset to a media asset collection, control circuitry ensures that the user will be made aware of the asset using various methods further described below. For example, control circuitry 304 may determine that the date corresponding to media asset "Mission: Impossible—Ghost Protocol," is Jan. 2, 2015, and that the date corresponding to media asset "Mission Impossible II" is Feb. 1, 2015. Control circuitry 304 may then determine that the searching date is Jan. 1, 2015, and that the threshold has been set to five days. In this example, control circuitry 304 may then select media asset "Mission: Impossible—Ghost Protocol" for inclusion into the media asset collection, while omitting media asset "Mission Impossible II" from the selection media asset collection.

In some embodiments, control circuitry 304 may identify a broadcast of a marathon, and define a collection to be composed of media assets aired during the marathon. A marathon is defined to mean a number of related media assets (e.g., at least two media assets) that are broadcast on the same channel with little or no interruption within a period of hours, for example, a marathon could take place over a period of twelve hours. Control circuitry 304 may determine a marathon by identifying media assets with a common set of media asset metadata, airing over a defined period of time. For example, control circuitry 304 may determine that a marathon of James Bond movies is taking place by analyzing metadata of media assets being broadcast on a given channel (e.g., Channel ABC), determining that five of the media assets include media asset metadata "James Bond" associated with a "primary character" field. Control circuitry 304 may then add the identified media asset to a collection of media assets, and refer to the collection as "James Bond Marathon" via a label, as previously discussed.

In some embodiments, control circuitry 304 may be configured to present media assets in a collection of media assets to the user in such a way that media assets not associated with a primary content provider are prioritized over media assets associated with a primary media content provider. By arranging media assets in such a way, a user may easily discover media assets from content providers that he or she is unfamiliar with. Control circuitry 304 may determine the primary content provider based on the user's viewing history stored in the user profile. For example, control circuitry 304 may determine that the user usually selects media assets from a first content provider (e.g., NETFLIX). Control circuitry 304 may in response prioritize for notification those media assets that are associated with a second content provider (e.g., HULU) over the assets associated with the first media content provider (e.g., NETFLIX). Such a prioritization may present an advantageous way of making the user aware of content offerings of a content provider that the user may not consider to be his or her primary content provider.

In some embodiments, control circuitry 304 may identify a first media asset of the collection and a second media asset of the collection, the first and second media assets having substantially similar content. For example, control circuitry 304 may identify a first media asset (e.g., the first episode of the fifth season of the show "Breaking Bad") which may be associated with a first content provider (e.g., NETFLIX), and a second media asset (e.g., also the first episode of the fifth season of the show "Breaking Bad") which may be associated with a second content provider (e.g., HULU). Both of these media assets may have substantially similar content.

In some embodiments, control circuitry 304 may determine whether two media assets have substantially similar content by comparing metadata associated with each media asset. For example, control circuitry 304 may compare the metadata of fields associated with title, year, genre, and duration associated with each asset. If, for example, the metadata of the first asset matches the metadata of the second asset, control circuitry 304 may consider that the two media assets have substantially similar content. Various metadata comparisons are possible.

In some embodiments, control circuitry 304 may determine whether two media assets have substantially similar content by comparing media asset video frames. For example, the first episode of the fifth season of the show "Breaking Bad" offered by a first content provider may include closing credits, while the first episode of the fifth season of show "Breaking Bad" offered by a second content provider may exclude the closing credits, which are typically added to the very end of a show or movie, and may be truncated or eliminated entirely by some content providers. Control circuitry 304 may then make a determination that two media assets have substantially the same content. For example, control circuitry 304 may compare all media asset video frames present in the first and second media assets, and determine whether the ratio of non-overlapping to overlapping video frames is below a certain threshold. For example, control circuitry 304 may set a threshold of 0.05, and determine that the two media assets are substantially similar when the ratio of non-overlapping to overlapping video frames is less than 0.05. Control circuitry 304 may use various image comparison techniques to determine whether two media assets overlap. Alternatively, control circuitry 304 may exclude the initial sequence of the first 1% of all media asset video frames of each media asset and the ending sequence of 5% of all media asset video frames of each media asset, as it may be common for the opening credits, corresponding to a set of initial video frames of a media asset, and the closing credits, corresponding to a set of the final video frames of a media asset, to be eliminated from a media asset. Control circuitry 304 may then apply the threshold comparison as previously described.

In some embodiments, control circuitry 304 may also compare the soundtrack of the first media asset to the soundtrack of the second media asset in a similar manner. Control circuitry 304 may combine such a comparison with a video frame comparison as described above, or replace the video frame comparison with a soundtrack comparison entirely. In another example, control circuitry 304 may compare only a subset of video frames to increase the speed of the determination process. For example, control circuitry 304 may compare video frames at various intervals, measured from the start of the playback of the media asset, to make this determination. For example, control circuitry 304 may compare the video frame that is shown after twenty minutes, thirty-two seconds, and thirty milliseconds after the start of playback of the first media asset to the corresponding frame of the second media asset, shown at the same time, and determine whether the two video frames depict the same content. Control circuitry 304 may make a set number of such comparisons to determine whether two media assets are substantially similar.

In some embodiments, control circuitry 304 may identify a first media asset authorization status and a second media asset authorization status, based on the user profile associated with the user. For example, the user profile may indicate that the user is authorized to view the first media asset (e.g., the first episode of the fifth season of the show "Breaking Bad" associated with first content provider NETFLIX) without paying a fee. Control circuitry 304 may make this determination by analyzing the user subscription records that may be stored in the user profile. For example user subscription records may list the content provider (e.g., NETFLIX), type of subscription associated with the user (e.g., a premium subscription or a basic subscription), types of authorization (e.g., full access without a fee, full access with the payment of a fee, discounted access during a certain time interval, etc.), and the authorization required to view an asset or a group of assets. In one example, control circuitry 304 may determine that an authorization status may indicate that the user is authorized to access all media assets offered by the content provider. In a second example, control circuitry 304 may determine that an authorization status may indicate that the user is authorized to access all media assets offered by the content provider, with the exception of a defined set of media assets. For example, control circuitry 304 may determine that in order to access the defined set of media assets, payment must be provided. In some cases such a set of media assets may be defined in media guidance data source 418, to which control circuitry 304 may then connect, via communications network 414 in order to determine the set of media assets. Lastly, the authorization status may be set individually for each media asset. For example, control circuitry 304 may determine that the authorization status associated with the first content provider (e.g., NETFLIX) of the first episode of the fifth season of the show "Breaking Bad," is different from the authorization status associated with the first content provider (e.g., NETFLIX) of the last episode of the fourth season of the show "Breaking Bad."

In some embodiments, control circuitry 304 may then identify a second media asset authorization status based on the user profile associated with the user. For example, the user profile may indicate that the user is authorized to view the second media asset (e.g., the first episode of the fifth season of the show "Breaking Bad" associated with second content provider HULU) only after completing a payment. Control circuitry 304 may make this determination based on the user subscription records that may be stored in the user profile in storage 308, and that the subscription records indicate that all media assets offered by the content provider (e.g. HULU) are available to a subscriber without paying a fee, with the exception of all episodes of the fifth season of "Breaking Bad."

In some embodiments, control circuitry 304 may determine that the user is authorized to access the first media asset of the collection based on the first media asset authorization status, but not the second media asset. For example, control circuitry 304 may determine that the user is a subscriber of the content provider associated with the first media asset (e.g., NETFLIX), and therefore may access the first media asset, and that the user has not made a payment to access the fifth season of "Breaking Bad," and therefore, the user is not authorized to access the second media asset of the collection.

In some embodiments, control circuitry 304 may prioritize for notification the first media asset over the second media asset. By prioritizing for notification the first media asset over the second media asset, control circuitry 304 may ensure that the user is aware of those content providers that do not require payment. Additionally, control circuitry 304 may help inform the user of content providers which the user may not have been previously aware of, especially when the content in which the user is interested in is not available from a primary provider.

In some embodiments, control circuitry 304 may determine media asset metadata in order recommend a collection of media assets to the user.

Figure 6:
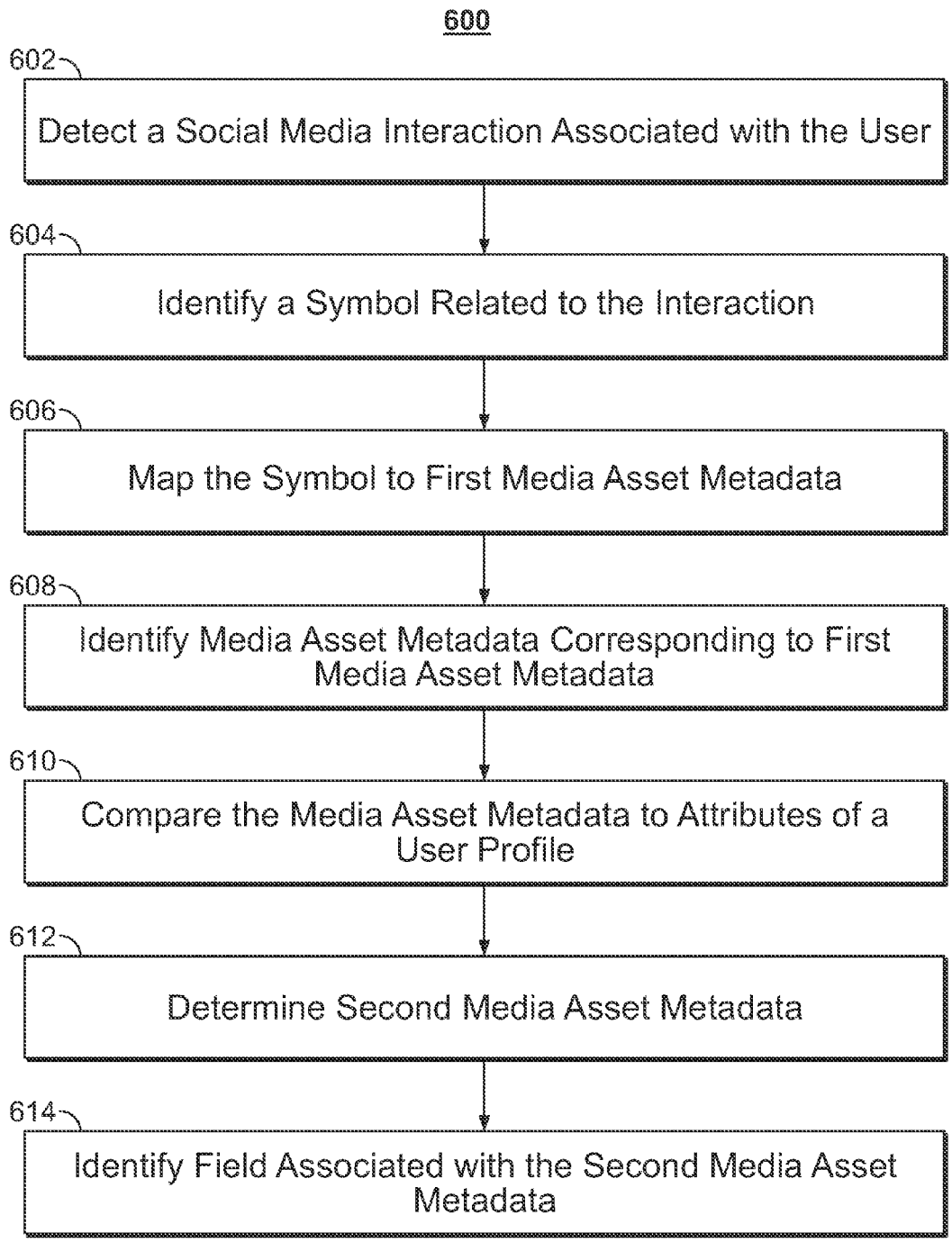
FIG. 6 is a flowchart of illustrative steps involved in determining second media asset metadata, in accordance with some embodiments of the disclosure.

FIG. 6 is a flowchart of illustrative steps involved in determining second media asset metadata, in accordance with some embodiments of the disclosure. It should be noted that process 600 or any step thereof could be performed on, or provided by, any of the devices shown in FIGS. 3-5. For example, process 600 may be executed by control circuitry 304 (FIG. 3) as instructed by control circuitry 304 implemented on user equipment 402, 404, and/or 406 (FIG. 4) in order to detect a social media interaction associated with a user. In addition, one or more steps of process 600 may be incorporated into or combined with one or more steps of any other process or embodiment.

Process 600 begins at 602, where control circuitry 304 may detect a social media interaction associated with a user. For example, control circuitry 304 may detect that the user has posted comment 506 "Is Tom Cruise going to be in the movie that's coming out?" on a friend's social media page 504 using user input interface 310. After control circuitry 304 detects social media interaction associated with a user, process 600 may continue to 604.

At 604, control circuitry 304 may identify a symbol related to the interaction. As an example, control circuitry 304 may identify "Tom Cruise" as a symbol present in the posted comment 506 "Is Tom Cruise going to be in the movie that's coming out?" Process 600 may then continue to 606.

At 606, control circuitry 304 may map the symbol related to the interaction to first media asset metadata. For example, control circuitry 304 may map "Tom Cruise" to first asset metadata "Tom Cruise," which may be associated with a field describing the metadata, such as "actor." To accomplish this, control circuitry 304 may use communications network 414 to access media guidance data source 418, which may include queryable data related to media assets. For example, media guidance data source 418 may be a database of ALLMOVIE.COM, which provides information about movies, programs, and actors. Alternatively, control circuitry 304 may search data in storage in 308 to determine data that may map the symbol to first media asset metadata. Once control circuitry 304 maps the symbol to first media asset metadata, process 600 may continue to 608.

At 608, control circuitry 304 may identify media asset metadata corresponding to the first media asset metadata. For example, control circuitry 304 may identify that media asset metadata such as "Mission Impossible II," associated with a "title" field, "Nicole Kidman," associated with an "actor" field, and "sci-fi movies," associated with a "genre" field correspond to the metadata "Tom Cruise," associated with the field "actor." Control circuitry 304 may select the plurality media asset metadata when it determines a correlation between the plurality media asset metadata and the first media asset metadata. For example, control circuitry 304 may determine that actor Tom Cruise has starred in the media asset "Mission Impossible II." Once control circuitry 304 identifies metadata corresponding to the first media asset metadata, process 600 may then continue to 610.

At 610, control circuitry 304 may compare media asset metadata corresponding to the first metadata, to a plurality of attributes of a user profile associated with the user. For example, control circuitry 304 may determine that the user profile reflects attributes such as the user's preference to view movies of the sci-fi genre, the user's preference to view media asset "Planet Earth: Oceans," and the user's preference to view movies directed by Wes Anderson. Control circuitry 304 may further compare the previously identified media asset metadata, including "Mission Impossible II," "Nicole Kidman," and "sci-fi movies," to the attributes reflected in the user profile. Once control circuitry 304 compares media asset metadata corresponding to the first metadata, to a plurality of attributes of a user profile associated with the user, process 600 may continue to 612.

At 612, control circuitry 304 may determine a second media asset metadata. Control circuitry 304 may determine a second media asset based on comparing the media asset metadata to attributes of a user profile. For example, control circuitry 304 may identify second media asset metadata "sci-fi movies" as matching an attribute of the user profile, "sci-fi movies." After control circuitry 304 determines a second media attribute, process 600 may continue to 614.

At 614, control circuitry 304 may identify a field associated with the identified media asset metadata. In the case of the media asset metadata "sci-fi movies," control circuitry 304 may determine that "genre" is the associated first field.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes.

In some embodiments, control circuitry 304 may determine a collection of media assets for recommending to the user, based on a determined metadata asset metadata.

Figure 7:
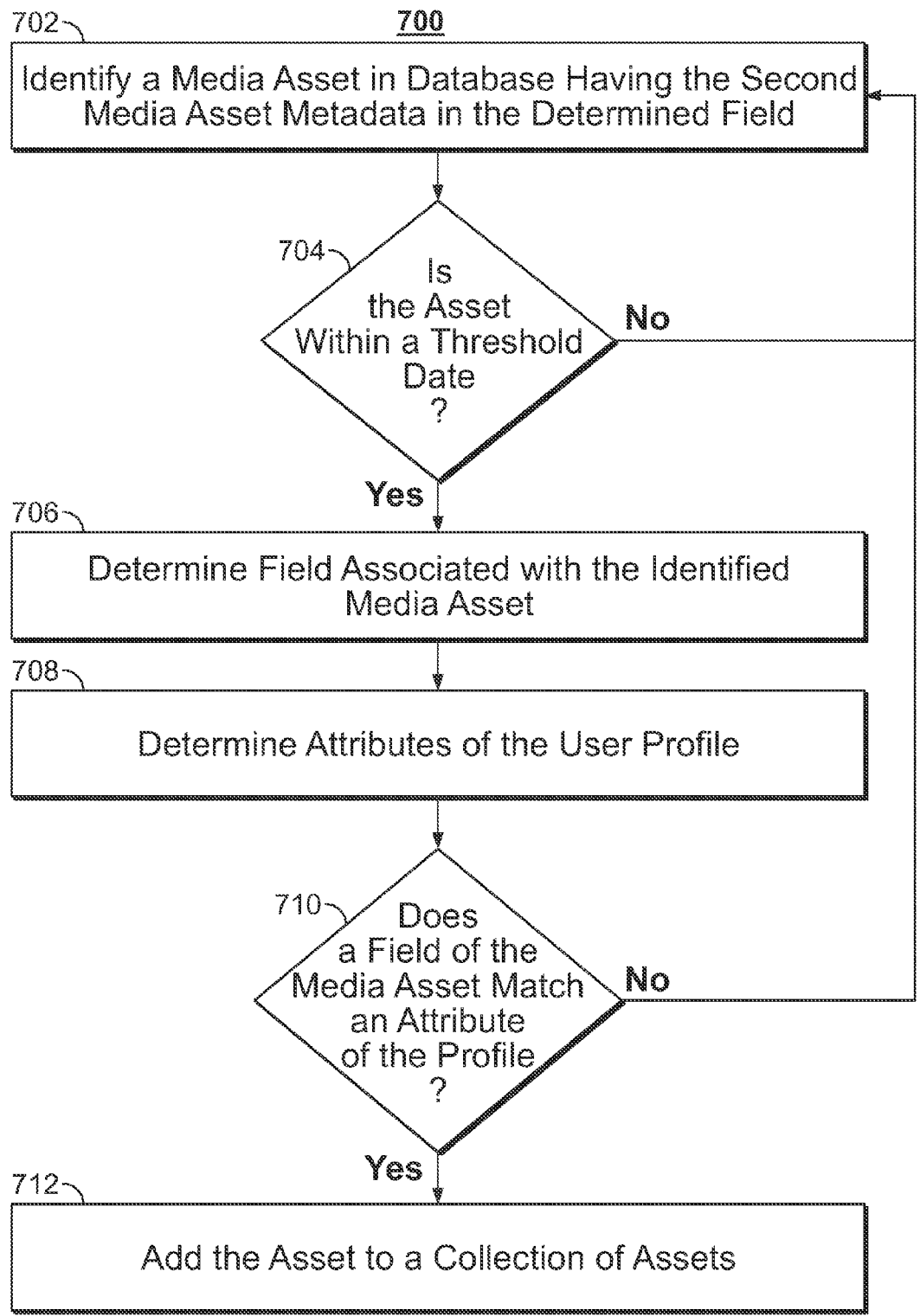
FIG. 7 is a flowchart of illustrative steps involved in determining a media asset collection for recommendation to the user based on determined second media asset metadata, in accordance with some embodiments of the disclosure.

FIG. 7 is a flowchart of illustrative steps involved in determining a media asset collection for recommendation to the user based on a determined second media asset metadata, in accordance with some embodiments of the disclosure. It should be noted that process 700 or any step thereof could be performed on, or provided by, any of the devices shown in FIGS. 3-5. For example, process 700 may be executed by control circuitry 304 (FIG. 3) as instructed by control circuitry implemented on user equipment 402, 404, and/or 406 (FIG. 4) in order to determine a set of attributes associated with the user profile. In addition, one or more steps of process 700 may be incorporated into or combined with one or more steps of any other process or embodiment.

At 702, control circuitry 304 may identify a media asset in a database having the second media asset metadata in a determined field. For example, control circuitry 304 may determine that the user subscribes to content providers (e.g., NETFLIX). Control circuitry 304 may search media asset metadata stored on each of the databases corresponding to the individual content providers to identify those media assets that are associated with the second media asset metadata. Control circuitry 304 may search each database by using communications network 414 to transmit a request to media guidance data source 418. Once control circuitry 304 identifies a media asset in a database having the second media asset in a determined field, process 700 may continue to 704.

At 704, control circuitry 304 may determine whether the asset has a date that is within a threshold amount of time with respect to the time the searching was performed. For example, control circuitry 304 may determine that the date corresponding to media asset "Mission: Impossible—Ghost Protocol," is Jan. 2, 2015. Control circuitry 304 may then determine that the searching date is Jan. 1, 2015, and that the threshold has been set to five days. In this example, control circuitry 304 may then select media asset "Mission: Impossible—Ghost Protocol" for inclusion into the media asset collection, and process 700 may continue to 706. If, on the other hand, the date corresponding to "Mission: Impossible—Ghost Protocol," is Jan. 20, 2015, control circuitry 304 may exclude the asset from the collection and return to 702.

At 706, control circuitry 304 may determine a field corresponding with the identified media asset. For example, control circuitry 304 may identify that media asset "Blade Runner" 518 is associated with media asset metadata "sci-fi movie," which is associated with a "genre" field. Once control circuitry 304 determines the field corresponding with the identified media asset, process 700 may continue to 708.

At 708, control circuitry 304 may determine a set of attributes associated with the user profile. For example, control circuitry 304 may identify a plurality of attributes of the user profile to be comprised of "sci-fi movies," "Tom Cruise," and "action spy movies." Further, control circuitry 304 may determine a plurality of fields associated with the identified collection of media assets. Once control circuitry 304 determines a set of attributes associated with the user profile, process 700 may continue to 710.

At 710, control circuitry 304 may determine whether a field of the media asset matches an attribute of the profile. Control circuitry 304 may access a locally stored profile at storage 308, or may connect to a remote server (e.g., via communications network 414). Control circuitry 304 may cross-reference a plurality of fields associated with the media asset with the identified attributes of the user profile. Control circuitry 304 may then determine that a field of the asset is matched to the plurality of attributes of the user profile. For example, control circuitry 304 may determine that media asset "Mission: Impossible—Ghost Protocol" matches an attribute of the determined set of user profile attributes, "sci-fi movies," "Tom Cruise," and "action spy movies." In this example, the control circuitry 304 may match the determined media asset with the "action spy movie" attribute. If control circuitry 304 determines that no fields of the media asset match an attribute of the user profile, process 700 may restart at 702. If instead, control circuitry 304 determines that at least one field of the media asset matches an attribute of the user profile, process 700 continues to 712.

At 712, control circuitry 304 may add the asset to a collection of assets. For example, control circuitry 304 may add media asset "Mission: Impossible to a collection of media assets.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes.

It should be noted that processes 600 and 700 or any step thereof could be performed on, or provided by, any of the devices shown in FIGS. 3-4. For example, process 600 may be executed by control circuitry 304 (FIG. 3) as instructed by control circuitry 304 implemented on user equipment 500, 404, and/or 406 (FIG. 4) in order to identify a symbol related to a social media interaction.

It is contemplated that the steps or descriptions of FIG. 6 and FIG. 7 may be used with any other embodiment of this disclosure. In addition, the steps and descriptions described in relation to FIG. 6 and FIG. 7 may be done in alternative orders or in parallel to further the purposes of this disclosure. For example, each of these steps may be performed in any order or in parallel or substantially simultaneously to reduce lag or increase the speed of the system or method.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM devices, or a random access memory, such as a hard drive device or a computer diskette, having a computer-readable program code stored thereon. It should also be understood that methods, techniques, and processes involved in the present invention may be executed using processing circuitry. For instance, detection of a social media interaction associated with a user may be performed by processing circuitry, e.g., by processing circuitry 306 of FIG. 3. The processing circuitry, for instance, may be a general purpose processor, a customized integrated circuit (e.g., an ASIC), or a field-programmable gate array (FPGA) within user equipment 300, media content source 416, or media guidance data source 418. For example, the media asset metadata as described herein may be stored in, and retrieved from, storage 308 of FIG. 3, or media guidance data source 418 of FIG. 4. Furthermore, processing circuitry, or a computer program, may update settings associated with a user, such as user profile attributes, updating the information stored within storage 308 of FIG. 3 or media guidance data source 418 of FIG. 4.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method of providing media asset recommendations to a user comprising:
    detecting a social media interaction associated with a user;
    identifying a symbol associated with the social media interaction;
    mapping the symbol to first media asset metadata; identifying a plurality of media asset metadata corresponding to the first media asset metadata;
    comparing media asset metadata of the plurality of media asset metadata corresponding to the first metadata to a plurality of attributes of a user profile associated with the user;
    identifying second media asset metadata of the plurality of media asset metadata that matches attributes of the plurality of attributes of the user profile based on the comparing; identifying a first field associated with the second media asset metadata;
    searching a plurality of databases to identify a collection of media assets for recommendation to the user, wherein the plurality of databases comprise a database of a first content provider and a database of a second content provider that is different from the first content provider, and wherein the searching comprises identifying media assets associated with the plurality of databases that comprise the second media asset metadata in a field corresponding to the first field; and
    performing an action to provide the user with access to the collection.

2. The method of claim 1, wherein the collection comprises a plurality of pointers that each, respectively, point to a media asset of the collection, wherein a first pointer of the plurality of pointers points to a retrievable media asset from the database of the first content provider, and wherein a second pointer of the plurality of pointers points to a retrievable media asset from the database of the second content provider.

3. The method of claim 1, wherein the field describes at least one of a title, genre, category, actor, lead character, director, producer, and review.

4. The method of claim 1, wherein the identifying second media asset metadata of the plurality of media asset metadata that matches the attributes of the plurality of attributes of the user profile further comprises:
    determining that media asset metadata of the plurality of media asset metadata matches attributes of the plurality of attributes of the user profile;
    calculating a preference metric for each media asset metadata of the plurality of media asset metadata, wherein the preference metric corresponds to a number of instances in which the media asset metadata is matched with attributes of the plurality of attributes of the user profile; and
    determining the second media asset metadata associated with the preference metric with the highest calculated value.

5. The method of claim 1, wherein the searching further comprises:
    identifying the plurality of attributes of the user profile;
    determining a plurality of fields associated with the identified collection of media assets;
    cross-referencing the determined plurality of fields with the plurality of attributes of the user profile to determine a set of media assets that matches the plurality of attributes; and selecting media assets of the plurality of media assets based on the cross-referencing.

6. The method of claim 1, wherein the social media interaction comprises at least one of: social feed viewing, viewing a post, writing a post, viewing a profile, updating a profile, detecting an update of an interest profile of a followed friend, detecting an update of an interest profile of a friend that follows the user, sending a message, and receiving a message.

7. The method of claim 1, wherein the searching further comprises:
   determining dates corresponding to media assets of the identified media assets that were found using the database of the first content provider;
   determining whether the dates are within a threshold amount of time with respect to a time the searching is performed; and
   in response to determining that the dates are within a threshold amount of time with respect to the time the searching is performed, adding the media assets of the identified media assets that were identified in the database of the first content provider to the collection.

8. The method of claim 7, wherein the dates comprise at least one of broadcast dates and dates of first media asset availability.

9. The method of claim 1, wherein performing an action to provide the user with access to the collection comprises at least one of: recording the media assets of the collection of media assets, adding the media assets of the collection of media assets to a watchlist, and notifying the user of the collection of media assets.

10. The method of claim 9, wherein notifying the user of the collection further comprises:
   identifying a first media asset of the collection and a second media asset of the collection, the first and second media assets having substantially similar content;
   identifying a first media asset authorization status and a second media asset authorization status, based on the user profile associated with the user;
   determining that the user is authorized to access the first media asset of the collection based on the first media asset authorization status but not the second media asset; and
   prioritizing for notification the first media asset over the second media asset.

11. A system for providing media asset recommendations to a user, the system comprising control circuitry configured to:
   detect a social media interaction associated with a user;
   identify a symbol associated with the social media interaction;
   map the symbol to first media asset metadata;
   identify a plurality of media asset metadata corresponding to the first media asset metadata;
   compare media asset metadata of the plurality of media asset metadata corresponding to the first metadata to a plurality of attributes of a user profile associated with the user;
   identify second media asset metadata of the plurality of media asset metadata that matches attributes of the plurality of attributes of the user profile based on the comparing;
   identify a first field associated with the second media asset metadata;
   search a plurality of databases to identify a collection of media assets for recommendation to the user, wherein the plurality of databases comprise a database of a first content provider and a database of a second content provider that is different from the first content provider, and wherein the searching comprises identifying media assets associated with the plurality of databases that comprise the second media asset metadata in a field corresponding to the first field; and
   perform an action to provide the user with access to the collection.

12. The system of claim 11, wherein the collection comprises a plurality of pointers that each, respectively, point to a media asset of the collection, wherein a first pointer of the plurality of pointers points to a retrievable media asset from the database of the first content provider, and wherein a second pointer of the plurality of pointers points to a retrievable media asset from the database of the second content provider.

13. The system of claim 11, wherein the field describes at least one of a title, genre, category, actor, lead character, director, producer, and review.

14. The system of claim 11, wherein the control circuitry is further configured, when identifying the second media asset metadata of the plurality of media asset metadata that matches the attributes of the plurality of attributes of the user profile further comprises, to:
   determine that media asset metadata of the plurality of media asset metadata matches attributes of the plurality of attributes of the user profile;
   calculate a preference metric for each media asset metadata of the plurality of media asset metadata, wherein the preference metric corresponds to a number of instances in which the media asset metadata is matched with attributes of the plurality of attributes of the user profile; and
   determine the second media asset metadata associated with the preference metric with the highest calculated value.

15. The system of claim 11, wherein the control circuitry is further configured, when searching, to:
   identify the plurality of attributes of the user profile;
   determine a plurality of fields associated with the identified collection of media assets;
   cross-reference the determined plurality of fields with the plurality of attributes of the user profile to determine a set of media assets that matches the plurality of attributes; and
   select media assets of the plurality of media assets based on the cross-referencing.

16. The system of claim 11, wherein the social media interaction comprises at least one of: social feed viewing, viewing a post, writing a post, viewing a profile, updating a profile, detecting an update of an interest profile of a followed friend, detecting an update of an interest profile of a friend that follows the user, sending a message, and receiving a message.

17. The system of claim 11, wherein the control circuitry is further configured, when searching, to:
   determine dates corresponding to media assets of the identified media assets that were found using the database of the first content provider;
   determine whether the dates are within a threshold amount of time with respect to a time the searching is performed; and
   in response to determining that the dates are within a threshold amount of time with respect to the time the searching is performed, add the media assets of the identified media assets that were identified in the database of the first content provider to the collection.

18. The system of claim 17, wherein the dates comprise at least one of broadcast dates and dates of first media asset availability.

19. The system of claim 11, wherein performing an action to provide the user with access to the collection comprises at least one of: recording the media assets of the collection of media assets, adding the media assets of the collection of media assets to a watchlist, and notifying the user of the collection of media assets.

20. The system of claim 19, wherein the control circuitry is further configured, when notifying the user of the collection, to:
- identify a first media asset of the collection and a second media asset of the collection, the first and second media assets having substantially similar content;
- identify a first media asset authorization status and a second media asset authorization status, based on the user profile associated with the user;
- determine that the user is authorized to access the first media asset of the collection based on the first media asset authorization status but not the second media asset; and
- prioritize for notification the first media asset over the second media asset.

* * * * *